United States Patent
Abbaszadeh et al.

(10) Patent No.: US 8,923,445 B1
(45) Date of Patent: Dec. 30, 2014

(54) COMPLEX SYMBOL DE-MAPPING USING SECTORING

(71) Applicant: L-3 Communications Corp., New York, NY (US)

(72) Inventors: Ayyoob D. Abbaszadeh, Salt Lake City, UT (US); David G. Landon, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/013,884

(22) Filed: Aug. 29, 2013

(51) Int. Cl.
  *H03K 9/06* (2006.01)
  *H04L 27/22* (2006.01)

(52) U.S. Cl.
  CPC .................................. *H04L 27/22* (2013.01)
  USPC .......................................................... 375/322

(58) Field of Classification Search
  CPC ..... H03D 3/007; H04L 27/22; H04L 27/0008
  USPC .......................................................... 375/322
  See application file for complete search history.

(56) References Cited

U.S. PATENT DOCUMENTS

| | | | | |
|---|---|---|---|---|
| 5,323,424 A | * | 6/1994 | Fazel et al. | 375/329 |
| 6,138,265 A | * | 10/2000 | Morelos-Zaragoza et al. | 714/792 |
| 6,370,201 B1 | | 4/2002 | Abbaszadeh et al. | |
| 6,996,189 B1 | * | 2/2006 | Morejon et al. | 375/261 |
| 7,483,497 B2 | | 1/2009 | Oh et al. | |
| 2002/0037062 A1 | * | 3/2002 | Riess et al. | 375/348 |
| 2005/0220220 A1 | * | 10/2005 | Belotserkovsky | 375/316 |
| 2009/0245433 A1 | | 10/2009 | Challa et al. | |
| 2011/0074500 A1 | * | 3/2011 | Bouillet et al. | 329/347 |
| 2012/0155579 A1 | * | 6/2012 | Zilberman et al. | 375/341 |

FOREIGN PATENT DOCUMENTS

WO    WO 2009/114024    9/2009

OTHER PUBLICATIONS

Kuschnerov et al., "Low Complexity Soft Differential Decoding of QPSK for Forward Error Correction in Coherent Optic Receivers," ECOC, Sep. 19-23, 2010, IEEE (3 pages).
Park et al., "Simplified Soft-Decision Demapping Algorithm for DVB-S2," ISOCC 2009, pp. 444-447.
Choi et al., "The Mapping and Demapping Algorithms for High Order Modulation of DVB-S2 Systems," IEEE 2006 (5 pages).

* cited by examiner

*Primary Examiner* — Juan A Torres
(74) *Attorney, Agent, or Firm* — Kirton | McConkie

(57) ABSTRACT

A symbol de-mapper can determine soft values for the bits of a complex symbol R that has been transmitted and received at a receiving device. The symbol de-mapper can reduce the number of calculations needed to determine soft values of the bits by limiting the symbols S utilized to calculate the soft values to subsets of the symbols S associated with sectors of symbol rings in the symbol constellation.

31 Claims, 15 Drawing Sheets

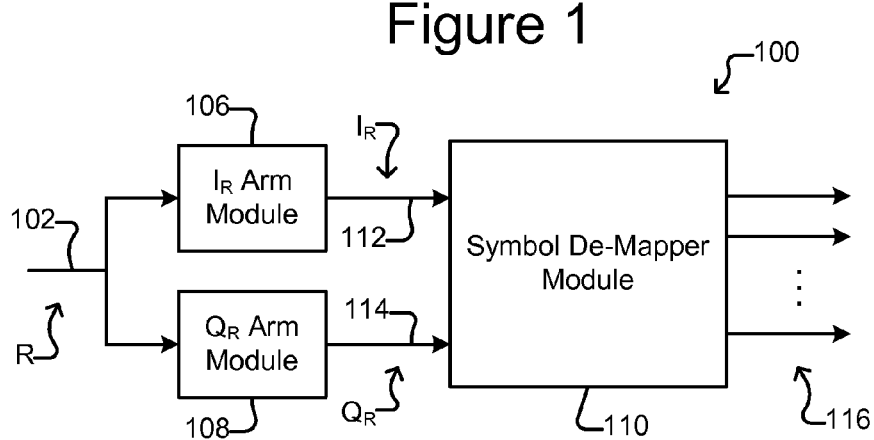
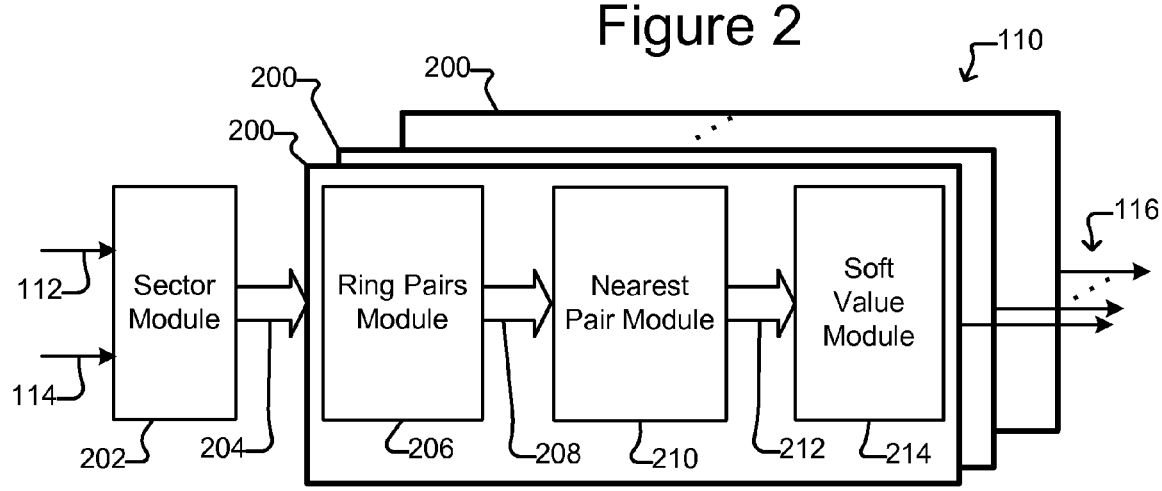

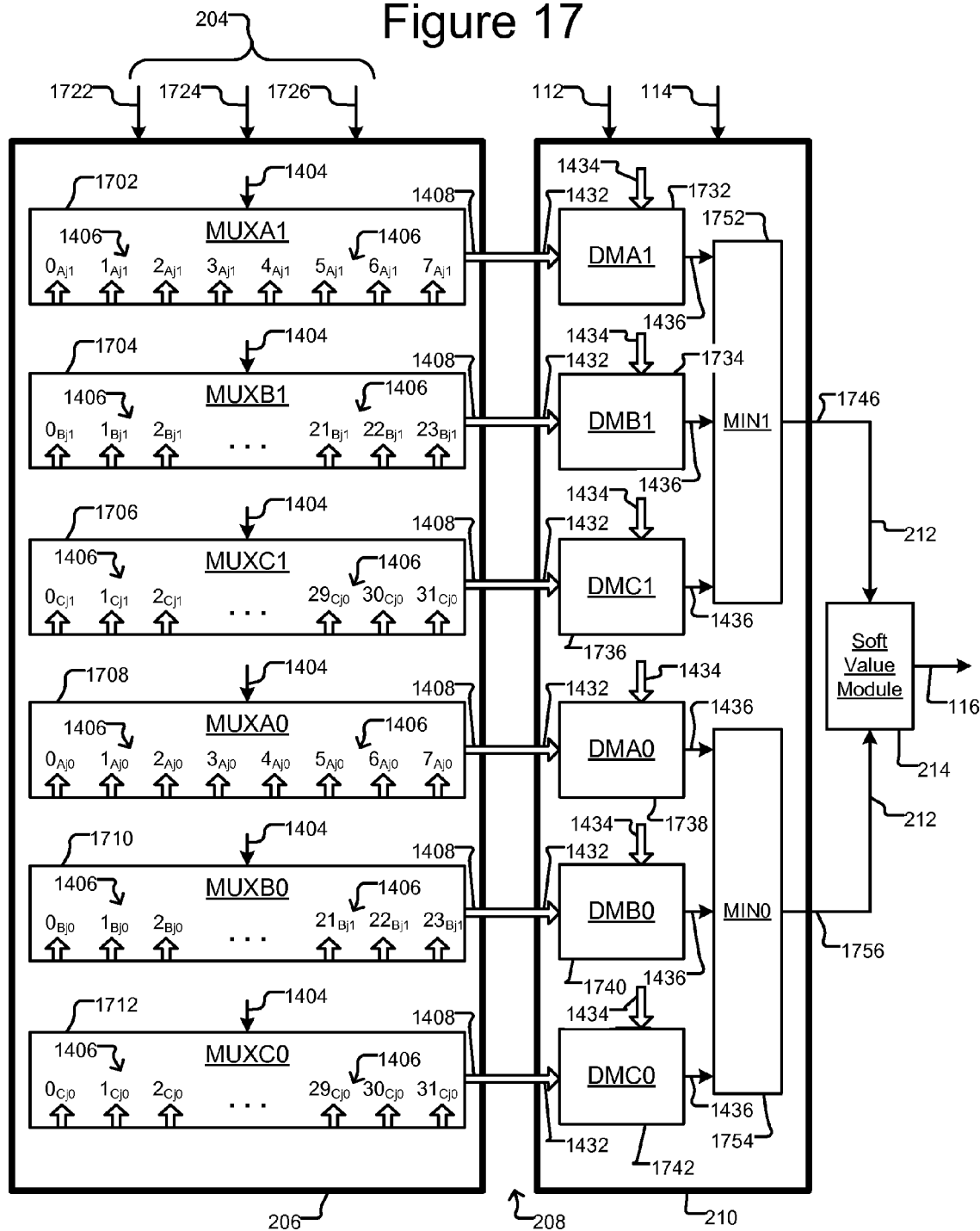

US 8,923,445 B1

COMPLEX SYMBOL DE-MAPPING USING SECTORING

BACKGROUND

Data, such as messages to be transmitted, can be modulated into symbols of a complex symbol constellation. Because each complex symbol can represent multiple bits, complex symbol constellations can increase transmission efficiencies over systems using symbols that represent only one bit. De-mapping complex symbols to, for example, log likelihood ratios suitable as inputs to modern forward error correction decoders can involve many complicated calculations and thus be computation intensive or require large look up tables that occupy large spaces in digital memories.

Some embodiments of the invention use sectoring to reduce the number and complexity of computations for de-mapping a received symbol from a complex symbol constellation. Some embodiments of the invention thus address one or more of the above-identified problems in the prior art and/or provide other advantages.

SUMMARY

Some embodiments of the invention can include a process of determining a soft value of a bit of a received symbol R, where the received symbol R corresponds to a symbol S in a constellation of symbols S each having a unique ordered pair of an in-phase $I_S$ component value and a quadrature $Q_S$ component value. The process can include receiving an electrical signal comprising a received symbol R, which can have an in-phase $I_R$ component and a quadrature $Q_R$ component. The process can also include identifying a location sector of a symbol ring in the constellation. The received symbol R can be located in the location sector, and the location sector can be one of a plurality of sectors of the symbol ring. The process can further include selecting a limited subset of the symbols S of the constellation. The limited subset can be related to the location sector and include less than all of the symbols S of the constellation. The process can also include determining with more than one of the symbols S of the limited subset a soft value of a jth bit of the received symbol R.

Some embodiments of the invention can include a process of determining a soft value of a bit of a received symbol R, where the received symbol R corresponds to a symbol S of a symbol constellation. Each of the symbols S in the constellation can have a unique ordered pair of an in-phase $I_S$ component value and a quadrature $Q_S$ component value, the symbols S can be disposed on a plurality of symbol rings in the constellation, and each symbol ring can comprise a plurality of sectors. The process can include receiving an electrical signal comprising a received symbol R, which can have an in-phase $I_R$ component and a quadrature $Q_R$ component. The process can further include identifying, for each of the symbol rings, one of the plurality of sectors as a location sector in which the received symbol R is located, and the process can include selecting with the location sectors a limited subset of the symbols S of the constellation. The limited subset of symbols S can include less than all of the symbols S of the constellation. The process can also include determining nearest symbols nSj1, nSj0 from the limited subset of the symbols S, where the symbol nSj1 is a nearest symbol S to the received symbol R, in the limited subset with a jth bit value of one, and the symbol nSj0 is a nearest symbol S to the received symbol R in the limited subset with a jth bit value of zero. The process can also include calculating with the symbol nSj1 and the symbol nSj0 a soft value of a jth bit of the received symbol R.

Some embodiments of the invention can include a symbol de-mapping apparatus for processing a received symbol R, where the received symbol R corresponds to a symbol S in a constellation of symbols S each having a unique ordered pair of an in-phase $I_S$ component value and a quadrature $Q_S$ component value. The apparatus can comprise a sector module, a ring pairs module, and a soft-value module. The sector module can receive as input an in-phase $I_R$ component and a quadrature $Q_R$ component of a received symbol R and output a location sector in which the received symbol R is located. The location sector can be one of a plurality of sectors of a symbol ring of the constellation. The ring-pairs module can receive as input the location sector from the sector module and output a limited subset of the symbols S of the constellation corresponding to the location sector, where the limited subset comprises less than all of the symbols S of the constellation. The soft-value module can calculate with more than one of the symbols S of the limited subset a soft value of a jth bit of the received symbol R.

BRIEF DESCRIPTION OF THE DRAWINGS

FIG. 1 illustrates an example of a complex symbol demodulator that can include a symbol de-mapper according to some embodiments of the invention.

FIG. 2 shows an example functional configuration of the symbol de-mapper of FIG. 1 according to some embodiments of the invention.

FIG. 17 shows example configurations of the ring-pair module, the nearest-pair module, and the bit-value module of FIG. 2 for de-mapping received symbols R of the 32APSK constellation of FIGS. 9A-9D according to some embodiments of the invention.

DETAILED DESCRIPTION OF EXEMPLARY EMBODIMENTS

Figure 3:
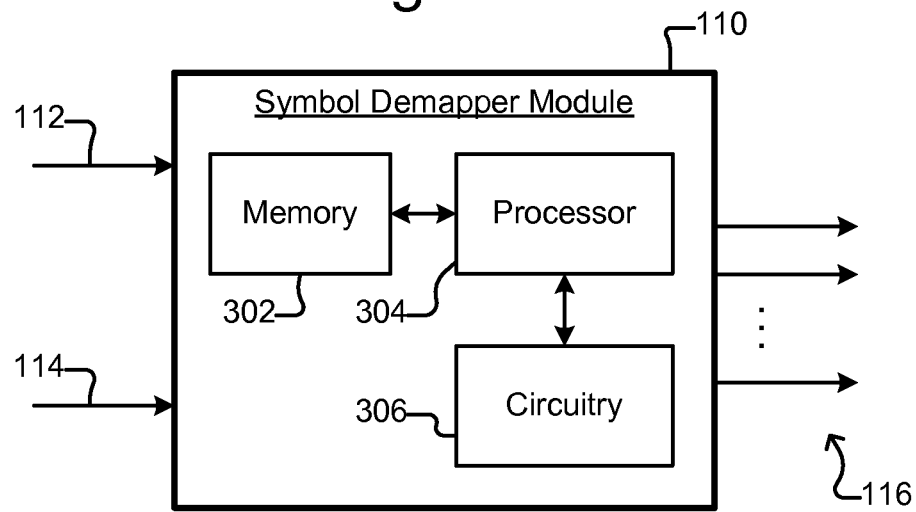
FIG. 3 is an example physical configuration of the symbol de-mapper of FIGS. 1 and 2 according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

A "bit" is a binary digit having two possible states, which are expressed herein in as a "zero" and a "one."

A "complex symbol," which is sometimes abbreviated "S" herein, is an electrical signal waveform that has an in-phase component and a quadrature component. The in-phase component is sometimes abbreviated "$I_S$," and the quadrature component is sometimes abbreviated "$Q_S$" herein. A complex symbol S represents n number of binary bits, wherein n is an integer. The notation Sj0 refers to a symbol S whose jth bit is zero, and Sj1 refers to a symbol S whose jth bit is one. The notation rSj0 refers to a symbol on the rth symbol ring in the constellation whose jth bit is zero, and the notation rSj1 refers to a symbol on the rth symbol ring whose jth bit is one.

The term "received symbol" is used herein to refer to a complex symbol S waveform that has been transmitted through a transmission channel to a receiving device. A received symbol is sometimes abbreviated "R" herein. Moreover, the in-phase component of a received symbol R is sometimes abbreviated "$I_R$," and the quadrature component of a received symbol R is sometimes abbreviated "$Q_R$" herein.

A "constellation" is a group of m number of complex symbols S each having a unique ordered pair of $I_S$ and $Q_S$ component values and thus a different position on an I/Q diagram of the constellation comprising an in-phase I axis and quadrature Q axis (where the I axis and the Q axis are perpendicular to each other and cross at a "center point" of the constellation). Each symbol S also represents a unique pattern of n binary bits, wherein $2^n = m$.

Herein, angles corresponding to a constellation originate from the positive portion of the I axis and are counter-clockwise about the center point of the constellation.

"Quadrant" is sometimes abbreviated QD, and the "quadrants" of a constellation, as used herein, are as follows: the first quadrant $QD_0$ is between the positive portions of the I axis and the Q axis; the second quadrant $QD_1$ is between the negative portion of the I axis and the positive portion of the Q axis; the third quadrant $QD_2$ is between the negative portions of the I axis and the Q axis; and the fourth quadrant $QD_3$ is between the positive portion of the I axis and the negative portion of the Q axis.

A "ring symbol pair rSj1, rSj0" refers to a pair of symbols on the rth symbol ring of a constellation in which the symbol rSj1 is the closest, to the received symbol R, symbol S on the rth ring whose jth bit is one, and the symbol rSj0 is the closest, to the received symbol R, symbol S on the rth ring whose jth bit is zero.

The "nearest symbols nSj1, nSj0" means the following: the symbol nSj1 is the closest symbol S in the constellation whose jth bit is one to the received symbol R, and the symbol nSj0 is the closest symbol S in the constellation whose jth bit is zero to the received symbol R.

The notation d(R, S) refers to a distance value that corresponds to a distance between the received symbol R and a symbol S. A distance value d(R, S) can be a function of, correspond to, be proportional to, or relate to the actual distance on an I/Q diagram of the constellation between the received symbol R and the symbol S. A distance value d(R, S) can also be the actual distance between the received symbol R and the symbol S.

A "hard value" of a bit is the believed value of the bit and is thus zero or one. A "soft value" of a bit is a probability (i.e., a likelihood) that the value of the bit is zero or one. For example, the sign of a soft value can indicate whether the bit is believed to be zero or one, and the magnitude of the soft value can indicate the certainty that the bit has the foregoing value.

The following symbols have the meanings indicated: "+" means mathematical addition, "−" means mathematical subtraction, "*" means mathematical multiplication, "/" means mathematical division, and "$^2$" means mathematical squaring.

Some embodiments of the invention are directed to a symbol de-mapper for determining soft values for the bits of a complex received symbol R. The symbol de-mapper can reduce the number of calculations performed to determine the soft bit values by limiting the symbols S utilized to calculate the soft bit values to subsets of the symbols S associated with one or more sectors of the symbol rings of the symbol constellation.

FIG. 1 illustrates an example of a symbol de-mapper module 110 according to some embodiments of the invention. As shown, the symbol de-mapper module 110 can be an element of a complex demodulator 100 for demodulating received symbols R of a constellation of complex symbols S. The complex demodulator 100 can receive a received symbol R at an input 102 and output 116 soft values of the n bits of the received symbol R. The complex demodulator 100 can be a component of a signal processing device for demodulating and decoding a stream of received symbols R. For example, the complex demodulator 100 can be part of a receiving device in a radio frequency (RF) receiver, a modem, or any electronic communications system or digital processing device.

As shown in FIG. 1, the complex demodulator 100 can comprise an input 102, an $I_R$ arm module 106, a $Q_R$ arm module 106, and a symbol de-mapper module 110. As is known, a complex symbol S—and thus the received symbol R—can comprise an in-phase component $I_R$ and an orthogonal quadrature component $Q_R$. The $I_R$ arm module 106 and $Q_R$ arm module 108 can receive the received symbol R and provide the $I_R$ and $Q_R$ components of the received symbol R as inputs 112, 114 to the symbol de-mapper module 110. The symbol de-mapper module 110 can produce at its output 116 from the $I_R$, $Q_R$ components soft values for each of the n bits of the received symbol R.

FIG. 2 illustrates an example functional configuration of the symbol de-mapper module 110, and FIG. 3 illustrates an example physical configuration of the symbol de-mapper module 110.

In the example illustrated in FIG. 2, the symbol de-mapper module 110 can comprise a sector module and a plurality of bit modules 200. The sector module 202 can receive as inputs 112, 114 the $I_R$, $Q_R$ components of the received symbol R and output a location sector 204 for each symbol ring of the constellation. The location sector is the sector of the symbol ring in which the received symbol R is located in an I/Q diagram of the constellation. The bit modules 200 can then utilize the location sector(s) 204 to identify and use a limited subset of the symbols S in the constellation to calculate soft values for the bits of the received symbol R.

As shown, each bit module 200 can determine a soft value for one of the n bits of the received symbol R. Alternatively, each bit module 200 can determine soft values for more than one of the bits of the received symbol R. In some embodiments, there can thus be between one and n number of bit modules 200. In the discussions below, calculation of a soft value for the jth bit of the received symbol R is discussed. Similar calculations can be repeated serially or performed in parallel to calculate soft values for all n of the bits of the received symbol R.

The sector module 202 can identify, from the $I_R$ and $Q_R$ components of a received symbol R, a location sector for each symbol ring of the constellation, where the location sector for a symbol ring one of a plurality of sectors into which the symbol ring is divided in which the received symbol R is located. The sector module 202 can thus provide one or more location sectors 204 to the bit modules 200, which as shown, can comprise a ring-pairs module 206, a nearest-pair module 210, and a soft-value module 214.

To calculate the jth bit of the received symbol R, the ring-pairs module 206 can utilize the location sectors 204 to identify a ring symbol pair rSj1, rSj0 for each symbol ring in the constellation. As defined above, the symbols rSj1, rSj0 in a ring symbol pair are the closest symbols on the symbol ring whose kth bits are one and zero, respectively, to any received symbol R in the location sector 204 of the symbol ring. The ring-pairs module 206 can thus provide as output 208, for each location sector 204 (and thus for each symbol ring in the symbol constellation), a ring symbol pair rSj1, rSj0.

The nearest-pair module 210 can then determine, from all of the ring symbol pairs rSj1, rSj0 208 identified by the ring-pairs module 206, the closest symbol Sj1 and the closest symbol Sj0 to the received symbol R. As defined above, the closest symbols Sj1, Sj0 are designated herein the nearest symbols nSj1, nSj0, which the nearest-pair module 210 can provide as output 212 to the soft-value module 214. Advantageously, the nearest-pair module 210 can ignore most of the symbols S in the constellation and select the nearest symbols nSj1, nSj0 from the ring symbol pairs rSj1, rSj0 208 output 208 by the ring-pairs module 206. The foregoing can significantly reduce the number of calculations and thus the processing time and complexity required to calculate a soft value for the kth bit of the received symbol R in some embodiments of the invention.

The soft-value module 214 can then utilize the nearest symbols nSj1, nSj0 to calculate a soft value for the kth bit of the received symbol R. Again advantageously, the soft-value module 214 can ignore most of the symbols S in the constellation and utilize only the nearest symbols nSj1, nSj0 to calculate a soft value for the kth bit of the received symbol R, which can significantly reduce the number of calculations and thus the processing time and complexity required to calculate a soft value for the kth bit of the received symbol R in some embodiments of the invention.

As noted, FIG. 3 illustrates an example physical configuration of the symbol de-mapper module 110 of FIGS. 1 and 2. As shown, embodiments of the symbol de-mapper module 110 can physically comprise a memory 302, a processor 304, and/or circuitry 306. The memory 302 can comprise one or more digital memory devices for storing digital data. For example, the memory 302 can comprise a semiconductor based memory, a magnetic based memory, a light based memory, or the like. The processor 304 can comprise one or more digital microprocessors, microcontrollers, computers, or the like. The circuitry 306 can comprise analog and/or digital electronic circuits. Any one or more of the sector module 202, ring-pairs module 206, nearest-pair module 210, and soft-value module 214 of FIG. 2 can be implemented in machine readable instructions (e.g., software, firmware, microcode, or the like) stored in the memory 302, and the processor 304 can operate in accordance with such machine readable instructions. Alternatively, any one or more of the sector module 202, ring-pairs module 206, nearest-pair module 210, and soft-value module 214 can comprise the circuitry 306, which can comprise, for example, hardwired digital logic circuitry. As another alternative, any one or more of the modules 202, 206, 210, 214 of FIG. 2 can comprise both software stored in the memory 302 and executed by the processor 304 and the circuitry 306.

Figure 4:
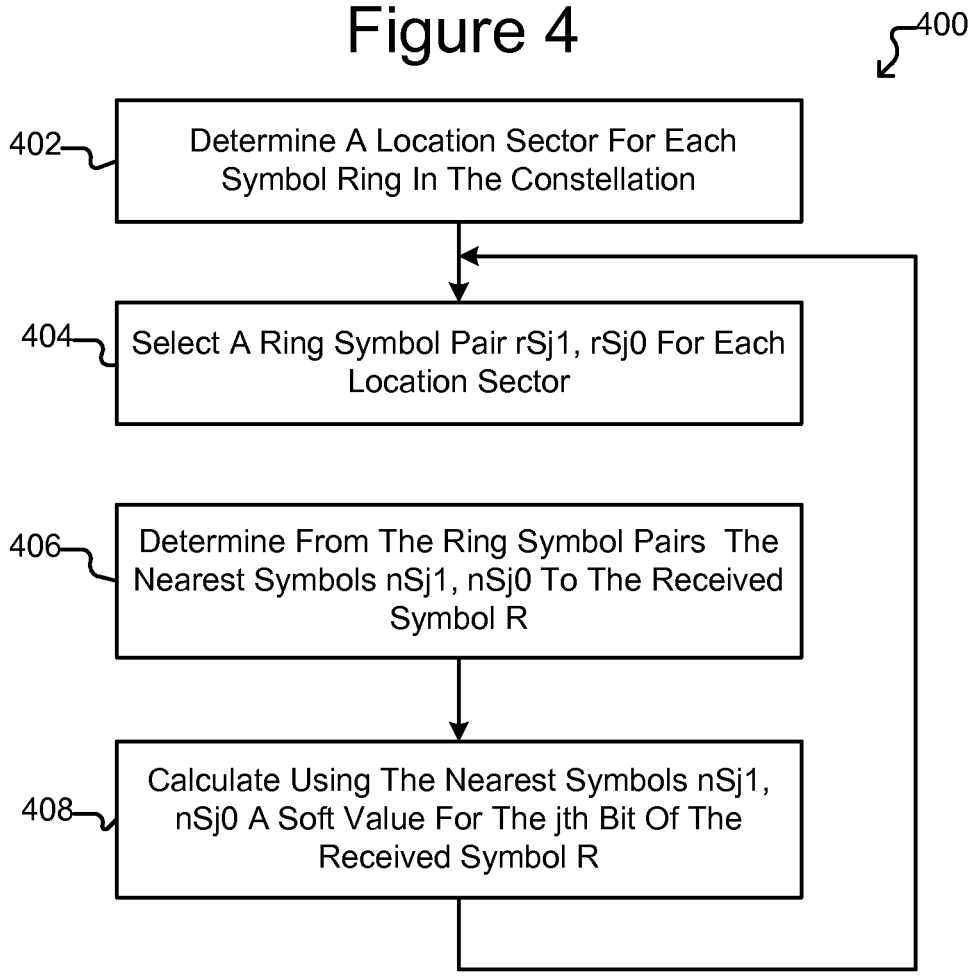
FIG. 4 illustrates a process for de-mapping a received symbol R according to some embodiments of the invention.
Figure 5:
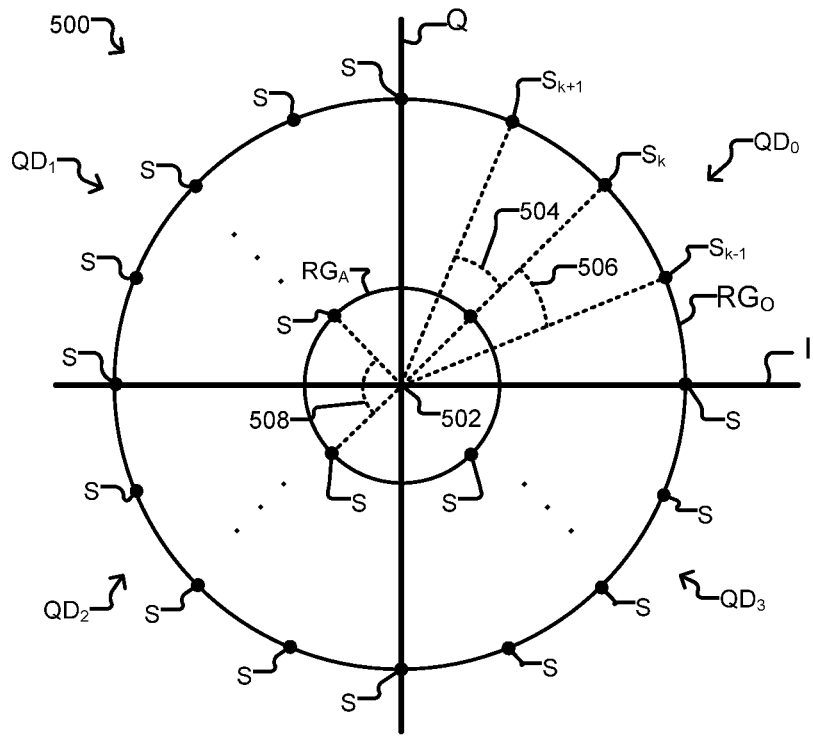
FIG. 5 shows a generic example of a complex symbol constellation.

FIG. 4 illustrates an example of a process 400 by which the symbol de-mapper module 110 can operate to produce soft values for the n bits of a received symbol R. As noted, the received symbol R can correspond to any symbol S in a constellation of complex symbols S each of which has a unique combination of $I_S$, $Q_S$ component values and represents a different pattern of n bits. FIG. 5 illustrates an example of such a constellation 500. Before turning to a discussion of the process 400 of FIG. 4, the constellation in FIG. 5 is briefly described.

FIG. 5 shows a constellation 500 of symbols S, which are plotted on an I/Q diagram comprising an I axis and an orthogonal Q axis that cross at a center point 502 of the diagram. As shown, the constellation 500 can comprise one or more symbol rings $RG_A, \ldots RG_O$ (two are shown but there can be only one or more than two) on which the complex symbols S of the constellation 500 can be located. As shown, the ring $RG_A$ can be an inner ring, and the ring $RG_O$ can be an outer ring.

Each ring $RG_A, \ldots RG_O$ can be centered at the center point 502, and the symbols S on a ring can be spaced uniformly so that the distance and angle between adjacent symbols S on a ring are substantially the same. Thus, for example, as illustrated in FIG. 5, the angle 504 between adjacent symbols $S_{k-1}, S_k$ on the outer ring $RG_O$ can be substantially the same as the angle 506 between adjacent symbols $S_k, S_{k+1}$. Similarly, the distance between adjacent symbols $S_{k-1}, S_k$ can be substantially the same as the distance between adjacent symbols $S_k, S_{k+1}$ on the outer ring $RG_O$. Similarly, all angles 508 between adjacent symbols S on inner ring $RG_A$ can be substantially the same. The angles 504, 506 between symbols S on the outer ring $RG_O$, however, need not be the same as the angles 504, 506 on another ring $RG_A$. Thus, for any constellation illustrated and discussed herein, all angles and distances between adjacent symbols S on the same ring $RG_A, \ldots RG_O$ can be substantially the same, although such angles and distances can be different for different rings.

Figure 6:
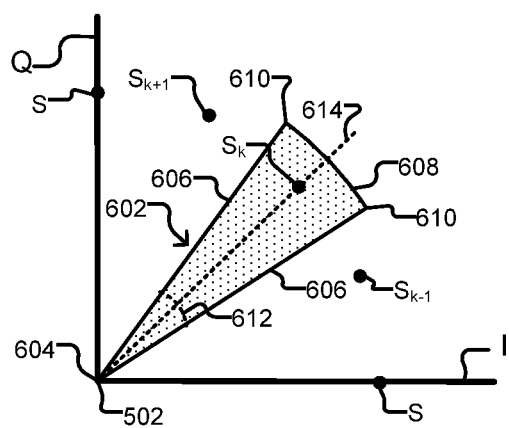
FIG. 6 illustrates an example of a type of sector that the symbol rings of the constellation of FIG. 5 can be divided into according to some embodiments of the invention.

Each ring $RG_A, \ldots RG_O$—or more specifically, the area inside each ring $RG_A, \ldots RG_O$—can be figuratively divided into sectors, which can be substantially equal in size. FIG. 6 illustrates an example of one type of sector 602, and FIG. 7 illustrates an example of another type of sector 702.

As shown in FIG. 6, a sector 602 for the outer ring $RG_O$ can be a circular sector with its origin 604 at the center point 502 of the constellation 500. The central angle 612 of the sector 602 can be substantially equal to the angles 504, 506 between adjacent symbols S on the ring $RG_O$, and a symbol $S_k$ can be located on an axis 614 that bisects the sector 602 (e.g., the axis 614 passes through the arc 608 of the sector 602 equal distances from the end points 610 of the arc 608, or the axis 614 is equal distances from the radii 606 of the sector 602). In some embodiments of the invention, each of the rings $RG_A, \ldots RG_O$ can be divided into sectors like sector 602. In such embodiments, each ring $RG_A, \ldots RG_O$ can be divided into as many sectors 602 as there are symbols S on the ring such that there is one sector 602 for each symbol S on the ring. All of the other rings $RG_A, \ldots RG_O$ of the constellation 500 can be similarly divided into sectors 602.

Figure 7:
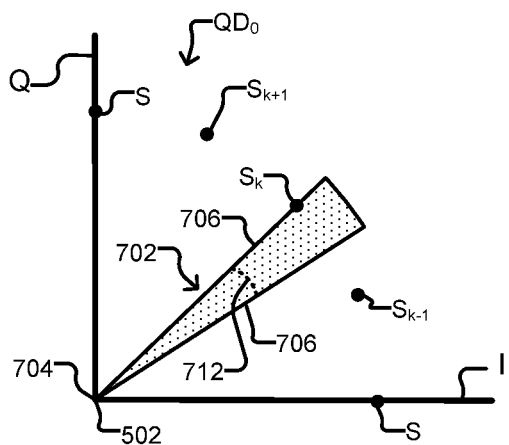
FIG. 7 shows another example of a type of sector that the symbol rings of the constellation of FIG. 5 can be divided into according to some embodiments of the invention.

As noted, FIG. 7 illustrates another example of a type of sector 702 into which each ring $RG_A, \ldots RG_O$ can be divided. As shown, the sector 702 can also be a circular sector with its origin 704 at the center point 502 of the constellation 500. The central angle 712 of the sector 702, however, can be substantially equal to one half of the angles 504, 506 between adjacent symbols S on a ring $RG_O$ (see FIG. 5). One of the radii 706 of the sector 702 can pass through one of the symbols $S_k$ on the ring $RG_O$, and the other radii 706 can pass between and be equal distance from the symbol $S_k$ and an adjacent symbol $S_{k-1}$. In some embodiments of the invention, each of the rings $RG_A, \ldots RG_O$ of a constellation 500 can be divided into sectors like sector 702. In such embodiments, each ring $RG_A, \ldots RG_O$ can be divided into twice as many sectors 702 as there are symbols S on the ring.

In describing operation of the process 400 of FIG. 4, reference will be made to the generic constellation 500 shown in FIG. 5 and to two specific examples of the generic constellation 500: an 8PSK (phase shift keying) constellation 800 shown in FIGS. 8A and 8B, and a 32APSK (amplitude phase shift keying) constellation 900 illustrated in FIGS. 9A-9D.

Figure 8A:
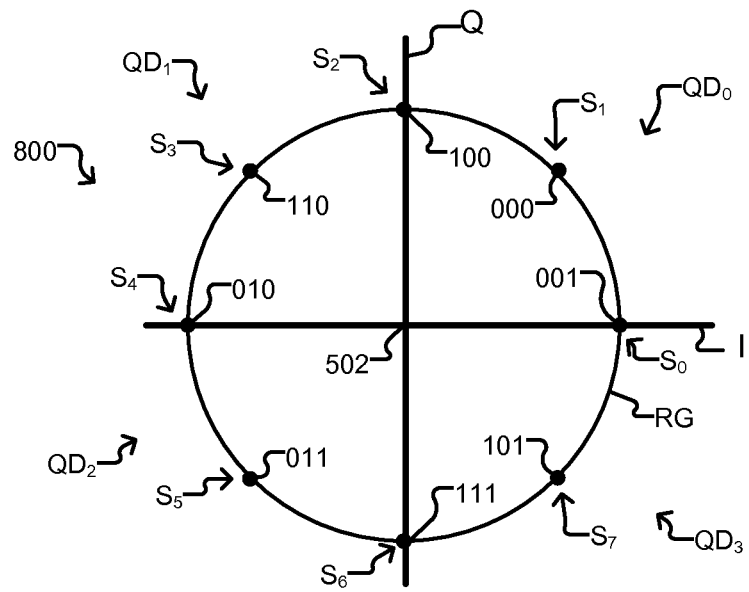
FIG. 8A is an example of an 8PSK symbol constellation having one symbol ring, which can be an example of the constellation of FIG. 5.
Figure 8B:
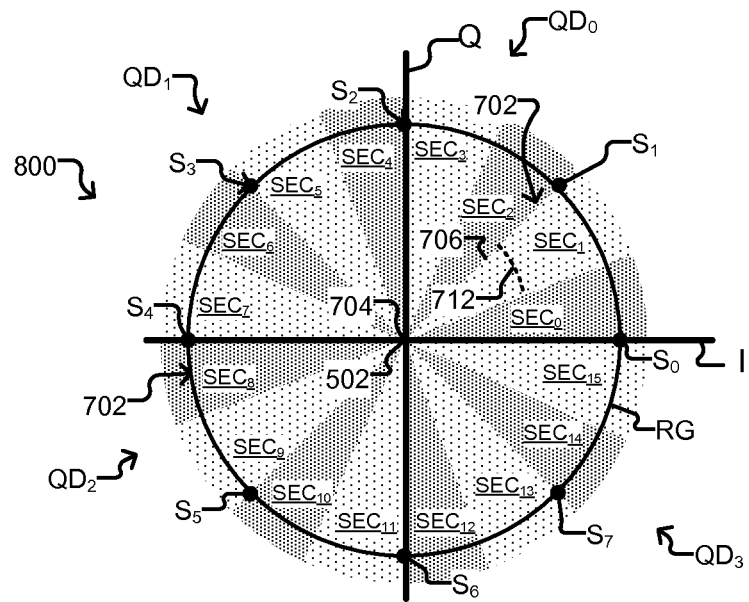
FIG. 8B shows the symbol ring of the 8PSK constellation of FIG. 8A divided into sectors of the type shown in FIG. 7 according to some embodiments of the invention.

FIGS. 8A and 8B illustrate an example constellation 800 that has eight symbols $S_0$-$S_7$ disposed equally about one ring RG. The constellation 800 can be an example of an 8PSK constellation such as is known in the field. FIG. 8A illustrates the constellation 800, and FIG. 8B shows the ring RG divided into sixteen sectors $SEC_0$ through $SEC_{15}$ that are the sector type 702 in FIG. 7. Thus, each sector $SEC_0$ through $SEC_{15}$ can have the attributes discussed above of the sector 702. The ring RG in the constellation 800 can alternatively be divided into sector types 602 shown in FIG. 6 or other types of sectors.

In the example illustrated in FIGS. 8A and 8B, the symbols $S_0, S_1, S_2, S_3, S_4, S_5, S_6, S_7$ of the 8QSK constellation 800 can correspond to the bit patterns shown in Table 1 below, where the most significant bit $b_2$ (MSB) is the left most bit and the least significant bit (LSB) $b_0$ is the right most bit.

TABLE 1

| Symbol | Bit Pattern ($b_2, b_1, b_0$) |
|---|---|
| $S_0$ | 001 |
| $S_1$ | 000 |
| $S_2$ | 100 |
| $S_3$ | 110 |
| $S_4$ | 010 |
| $S_5$ | 011 |
| $S_6$ | 111 |
| $S_7$ | 101 |

The foregoing bit patterns and the positions of the symbols $S_0$-$S_7$ in FIG. 8A are examples only, and the bit pattern and positions of the symbols $S_0$-$S_7$ can be different than shown.

Figure 9A:
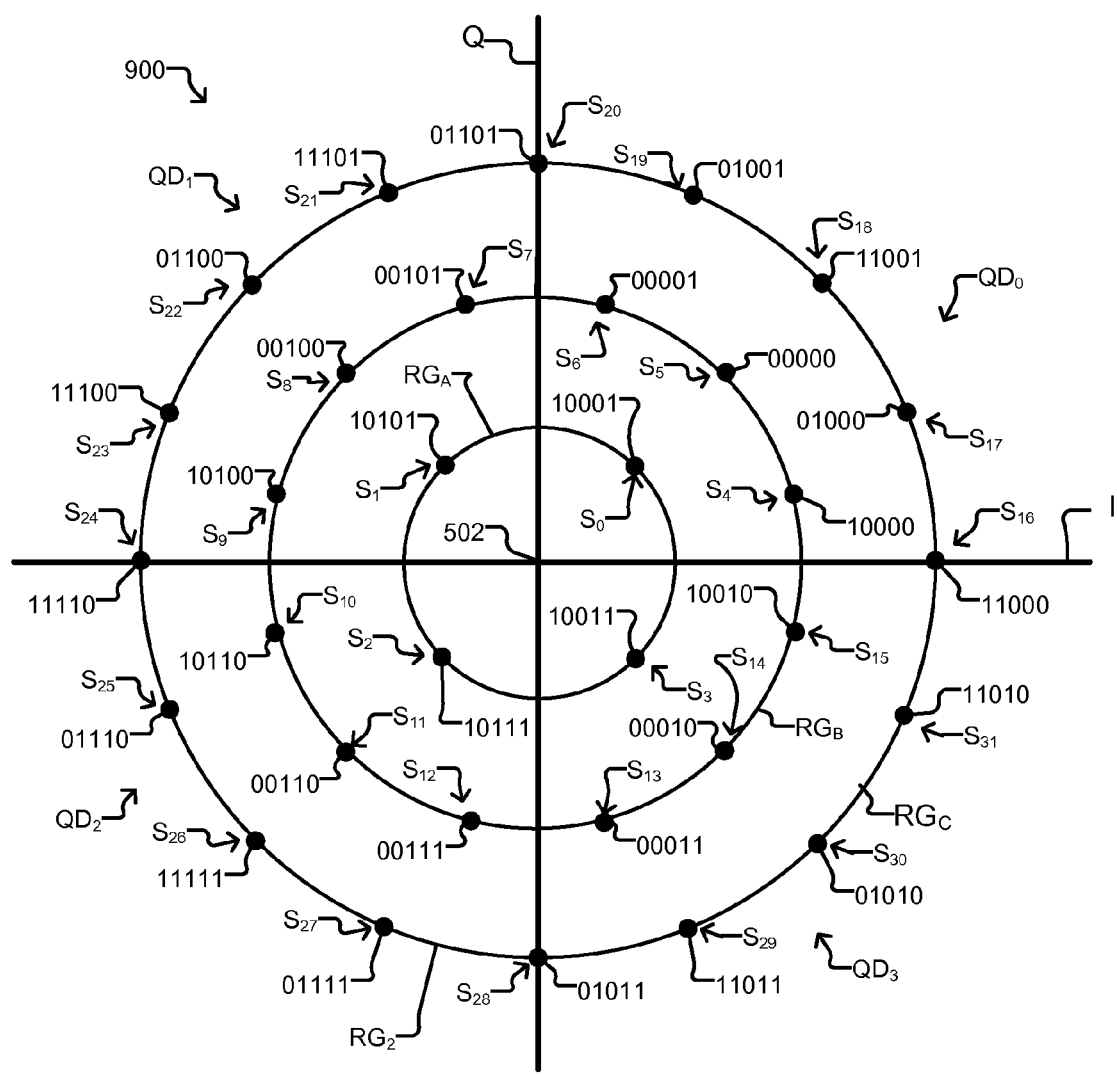
FIG. 9A is an example of a 32APSK symbol constellation having three symbol rings, which can be another example of the constellation of FIG. 5.
Figure 9B:
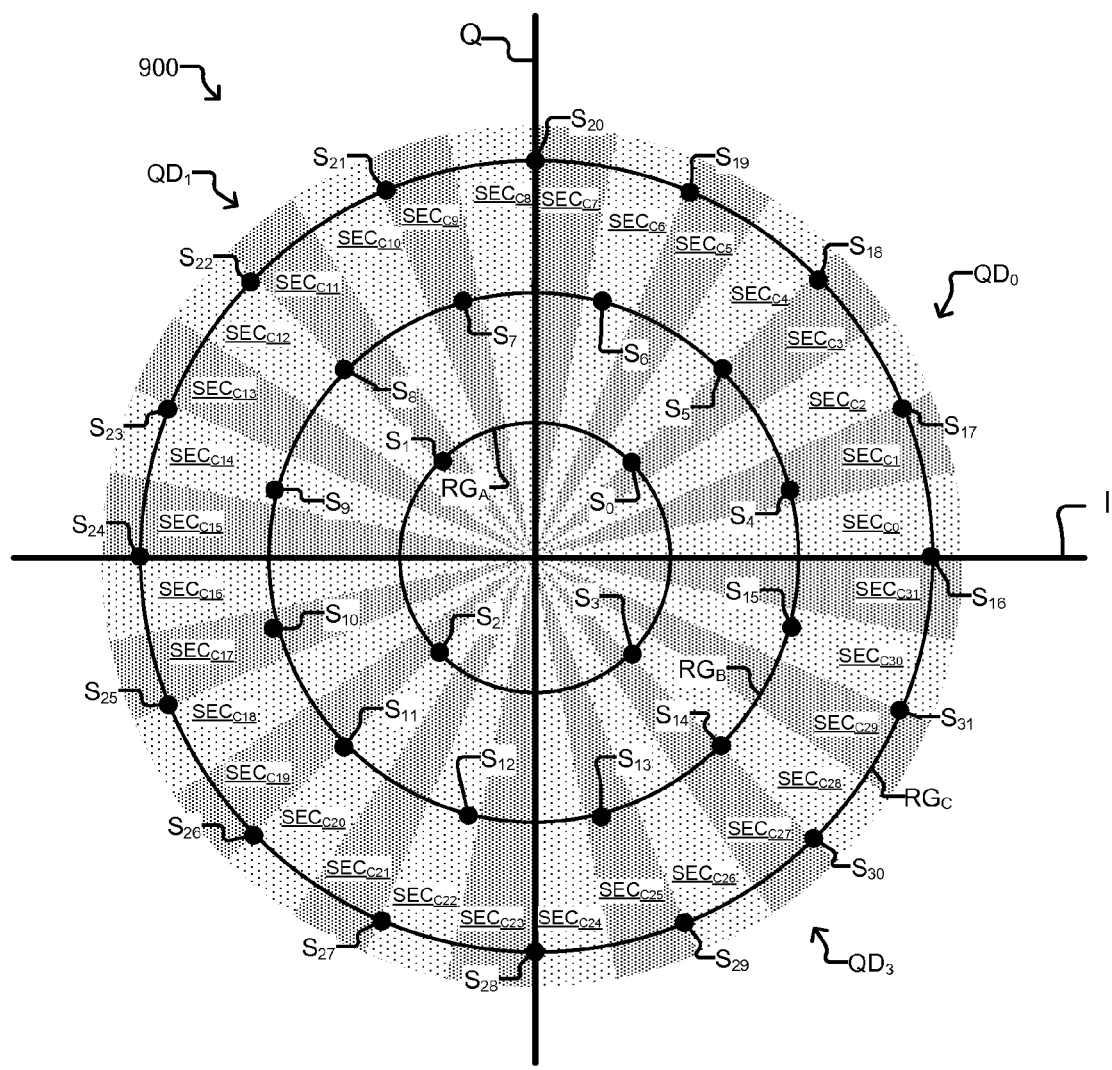
FIG. 9B shows a third and outer ring of the 32APSK constellation of FIG. 9A divided into sectors of the type shown in FIG. 7 according to some embodiments of the invention.
Figure 9C:
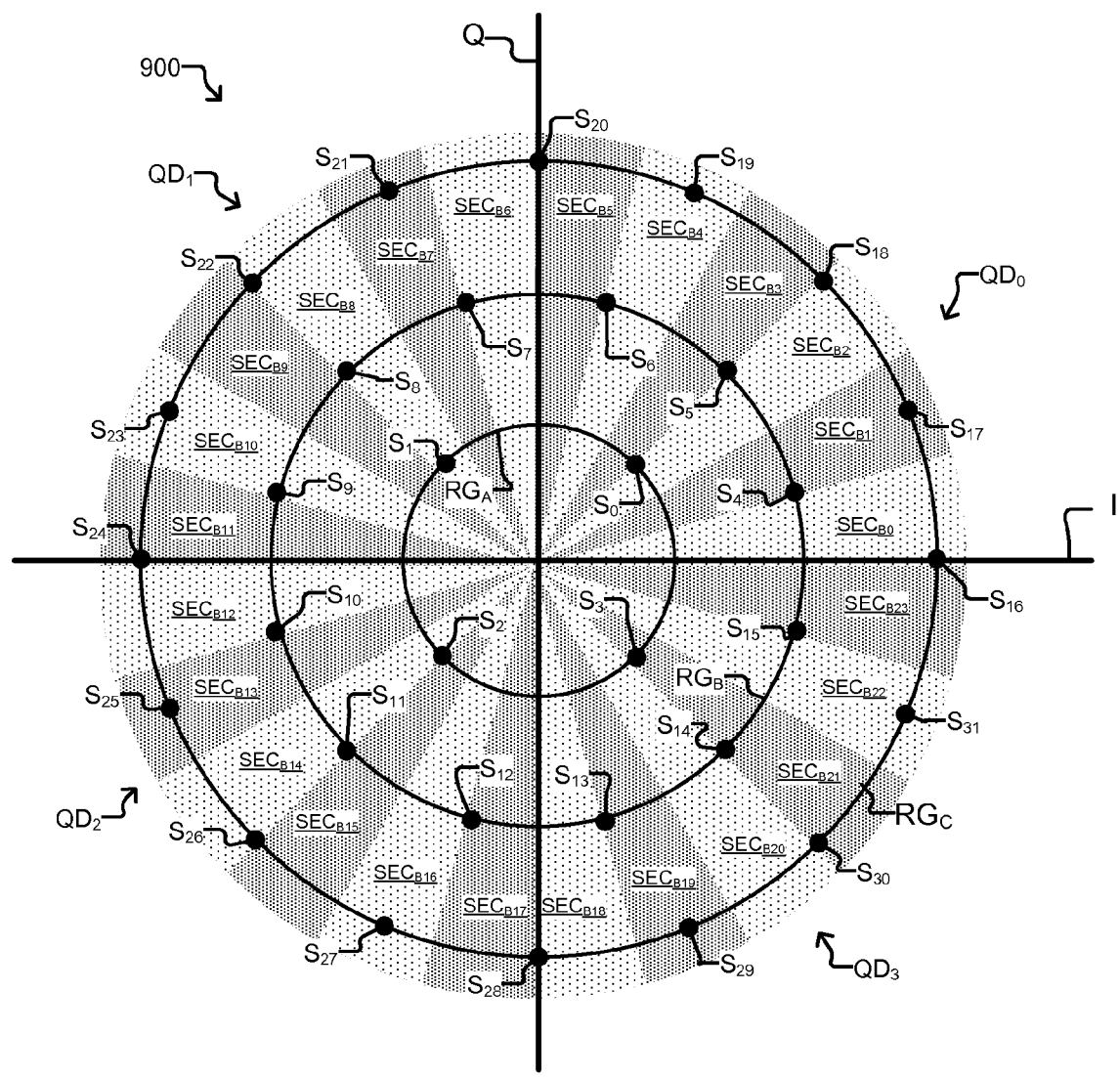
FIG. 9C illustrates a first ring of the 32APSK constellation of FIG. 9A divided into sectors of the type shown in FIG. 7 according to some embodiments of the invention.
Figure 9D:
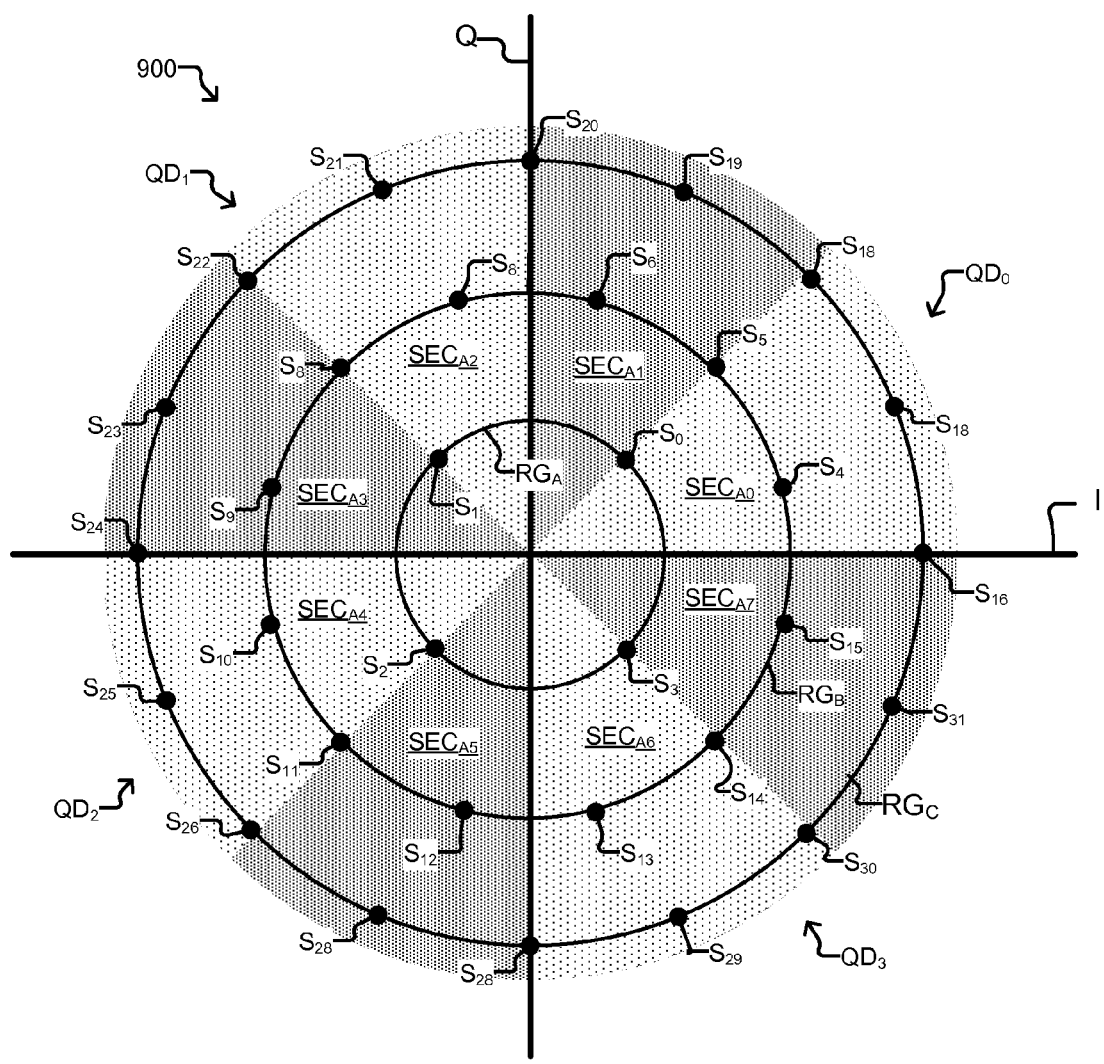
FIG. 9D shows a second ring of the 32APSK constellation of FIG. 9A divided into sectors of the type shown in FIG. 7 according to some embodiments of the invention.

FIGS. 9A-9D illustrate an example constellation 900 that has thirty-two total symbols $S_0$-$S_{31}$ in which four symbols $S_0$-$S_3$ are disposed equally about a first ring $RG_A$, twelve symbols $S_4$-$S_{15}$ are disposed equally about a second ring $RG_B$, and sixteen symbols $S_{16}$-$S_{31}$ are disposed equally about a third and outer ring $RG_C$. As noted, the constellation 900 can be an example of a 32APSK constellation such as is known in the field. FIG. 9A illustrates the constellation 900; FIG. 9B shows the outer ring $RG_C$ divided into thirty-two sectors $SEC_{C0}$-$SEC_{C31}$; FIG. 9C shows the first ring $RG_A$ divided into eight sectors $SEC_{A0}$-$SEC_{A7}$; and FIG. 9D shows the second ring $RG_B$ divided into twenty-four sectors $SEC_{B0}$-$SEC_{B23}$. All of the sectors in FIGS. 9B-9D are the sector type 702 in FIG. 7. The rings $RG_A, RG_B, RG_C$ of the constellation 900 can alternatively be divided into sector types 602 shown in FIG. 6 or other types of sectors.

In the example illustrated in FIGS. 9A-9D, the symbols $S_0$-$S_{31}$ of the 32APSK constellation 900 can correspond to the bit patterns shown in Table 2 below, where the most significant bit $b_4$ (MSB) is the left most bit and the least significant bit (LSB) $b_0$ is the right most bit.

TABLE 2

| Symbol | Bit Pattern ($b_4, b_3, b_2, b_1, b_0$) |
|---|---|
| $S_{28}$ | 01011 |
| $S_{29}$ | 11011 |
| $S_{30}$ | 01010 |
| $S_{31}$ | 11010 |

The foregoing bit patterns and the positions of the symbols $S_0$-$S_{31}$ in FIG. 9A are examples only, and the bit pattern and positions of the symbols $S_0$-$S_{31}$ can be different than shown.

The process 400 of FIG. 4 will now be described with respect to the general constellation 500 shown in FIG. 5 and also the 8PSK constellation 800 and the 32APSK constellation 900, which as noted, are specific examples of the general constellation 500. The foregoing, however, is for ease of illustration and discussion, and the process 400 is not limited to operating with respect to the constellations 500, 800, 900.

The process 400 of FIG. 4 can be performed by the symbol de-mapper module 110 (e.g., configured as shown in FIGS. 2 and 3) each time a new received symbol R is received at the input 102 to the complex demodulator 100 (see FIG. 1) and the $I_R$ arm module 106 and $Q_R$ arm module 108 provide the $I_R$, $Q_R$ components of the received symbol R as inputs 112, 114 to the symbol de-mapper module 110.

As shown in FIG. 4, at step 402, the process 400 can determine for each symbol ring $RG_A$, ... $RG_O$ of the constellation 500 a location sector in which the received symbol R is located. (See FIG. 5.) For example, for the 8PSK constellation 800 illustrated in FIGS. 8A and 8B, there is one ring RG, and the process 400 can determine in which of the sectors $SEC_0$ through $SEC_{15}$ the received symbol R is located. With respect to the example of a 32ASPK constellation 900 illustrated in FIGS. 9A-9D, there are three rings $RG_A$, $RG_B$, $RG_C$, and the process can determine: for the outer ring $RG_C$, in which of the sectors $SEC_{C0}$ through $SEC_{C31}$ the received symbol R is located; for the first ring $RG_A$, in which of the sectors $SEC_{A0}$ through $SEC_{A3}$ the received symbol R is located; and for the second ring $RG_B$, in which of the sectors $SEC_{B0}$ through $SEC_{B23}$ the received symbol R is located.

Figure 10:
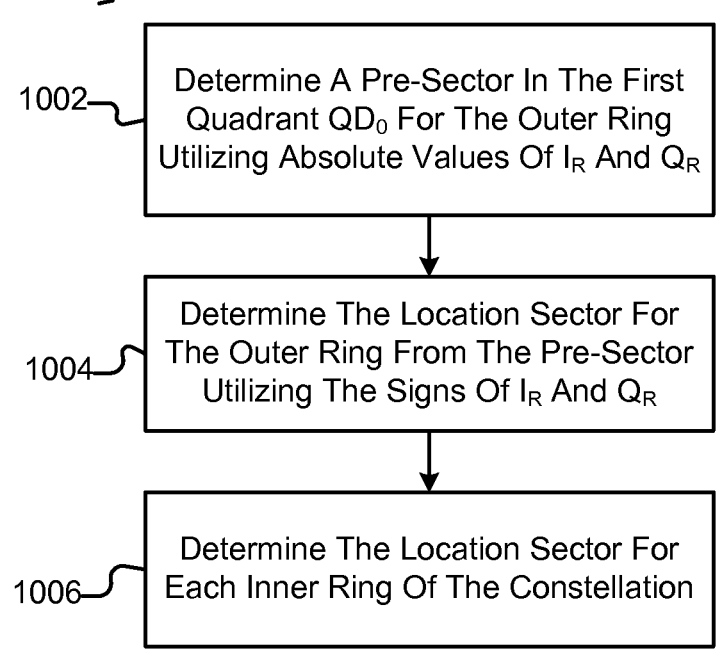
FIG. 10 is a flow chart of an example process by which step 402 of FIG. 4 can be performed according to some embodiments of the invention.

Step 402 can be performed by the sector module 202 in FIG. 2. FIG. 10 illustrates a process 1000 by which step 402 can be performed, and FIG. 11 illustrates an example configuration of the sector module 202, which can operate in accordance with the process 1000.

As shown in FIG. 10, at step 1002, the process 1000 can utilize the absolute values of the $I_R$, $Q_R$ components of the received symbol R to identify a sector (referred to herein as the "pre-sector") of the outer ring $RG_O$ in the first quadrant $QD_0$ of the constellation 500. At step 1004, the process 1000 can then use the signs of the $I_R$, $Q_R$ components to determine, from the pre-sector, the location sector of the outer ring $RG_O$. As noted above, the location sector is the sector in which the received symbol R is located, which of course, can be in any quadrant $QD_0$-$QD_3$ of the constellation. At step 1006, the process 1000 can determine the location sector for all additional inner rings $RG_A$, .... The process 1000 can utilize the location sector of the outer ring $RG_O$ to determine the location sectors of the inner rings $RG_A$, ..., and/or the process 1000 can repeat steps 1002, 1004 for the inner rings $RG_A$, ....

Figure 11:
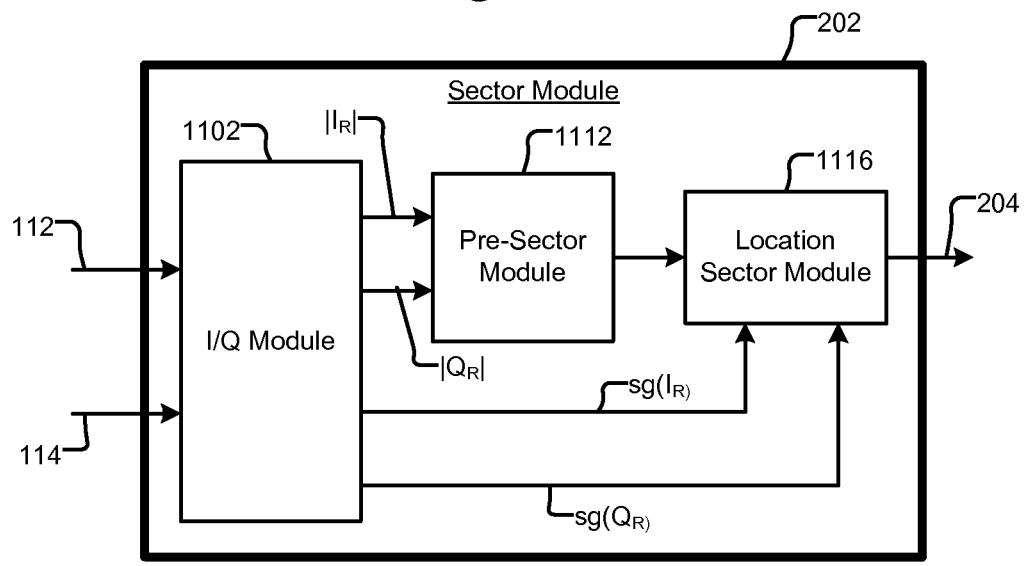
FIG. 11 illustrates an example configuration of the sector module of FIG. 2 according to some embodiments of the invention.

The sector module 202, configured as shown in FIG. 11, can perform step 1002 as follows. The I/Q module 1102 can receive as inputs 112, 114 the $I_R$, $Q_R$ components of the received symbol R. The I/Q module 1102 can provide the absolute values $|I_R|$, $|Q_R|$ of the $I_R$, $Q_R$ components to a pre-sector module 1112, which can provide the pre-sector to a location sector module 1116. As shown, the I/Q module 1102 can also provide the signs sgn($I_R$), sgn($Q_R$) to the location sector 1116.

Figure 12:
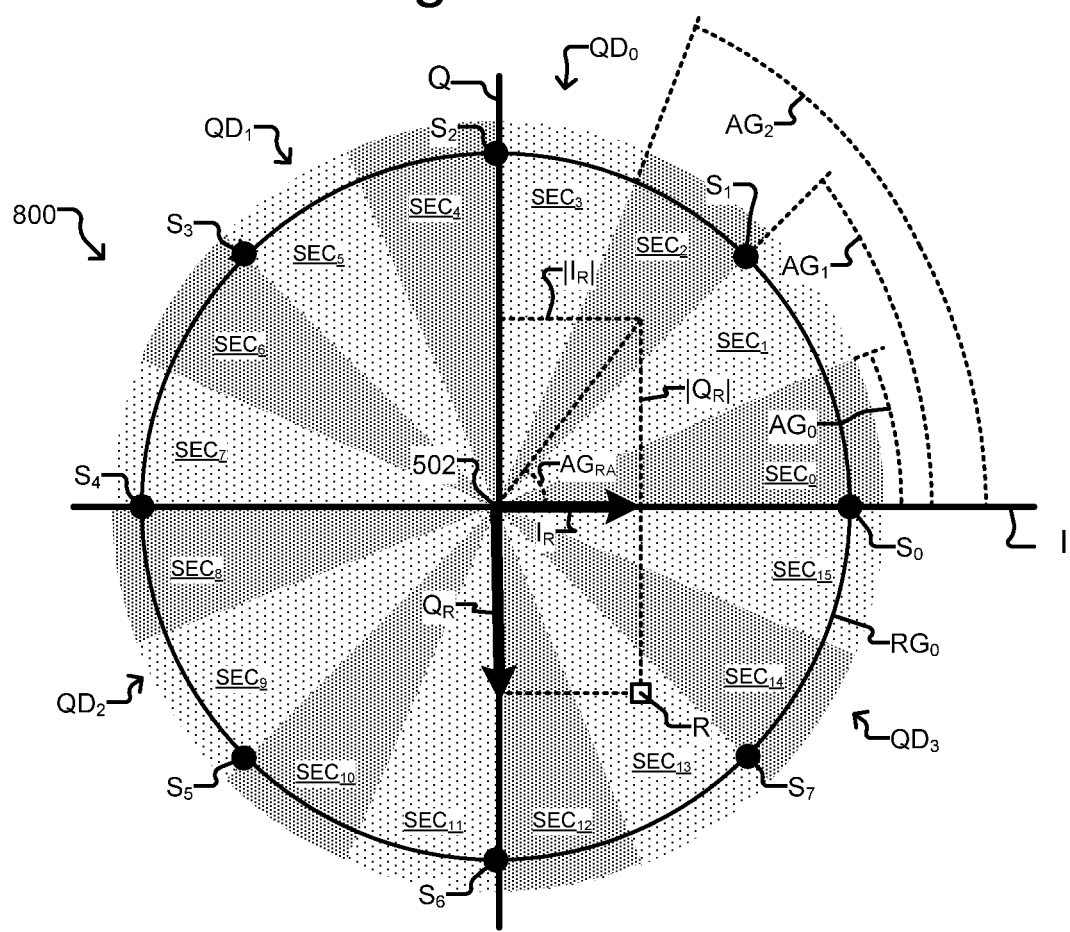
FIG. 12 illustrates an example of finding the location sector in the symbol ring of the 8PSK constellation of FIGS. 8A and 8B according to some embodiments of the invention.

FIG. 12 illustrates an example with respect to the 8PSK constellation 800 of FIGS. 8A-8B, and FIGS. 13A-13C illustrate an example with respect to the 32APSK constellation 900 of FIGS. 9A-9D.

The example in FIG. 12 is discussed first. For purposes of illustration and discussion, a received symbol R is illustrated in FIG. 12 as having a positive $I_R$ component with the magnitude shown and a negative $Q_R$ component with the magnitude shown, which places the received symbol R in the four-teenth sector $SEC_{13}$. The foregoing, however, is merely an example, and the $I_R$, $Q_R$ components of any received symbol R can have other magnitudes and signs and thus be located anywhere in the constellation 800.

To determine the pre-sector in the first quadrant $QD_0$ at step 1002, the process 1000 (e.g., executed by the sector module 202) can determine an angle $AG_{RA}$ of the absolute values $|I_R|$, $|Q_R|$ of the $I_R$, $Q_R$ components of the received symbol R. As is known, the trigonometric tangent of the angle $AG_{RA}$ is $Q_R/I_R$. Because the absolute values of $I_R$, $Q_R$ are used, the angle $AG_{RA}$ will always be in the first quadrant $QD_0$ of the constellation 800. As can be seen in FIG. 12, there are four sectors $SEC_0$, $SEC_1$, $SEC_2$, $SEC_3$ that are at least partially in the first quadrant $QD_0$. The pre-sector is thus one of the foregoing four sectors $SEC_0$, $SEC_1$, $SEC_2$, $SEC_3$. At step 1002, the process 1000 can determine which sector $SEC_0$, $SEC_1$, $SEC_2$, $SEC3$ is the pre-sector by determining whether the angle $AG_{RA}$ is less than a first angle $AG_0$ from the positive portion of the I axis to the border between the first two sectors $SEC_0$, $SEC_1$, in which case the pre-sector is the first sector $SEC_0$; if not, whether the angle $AG_{RA}$ is greater than the first angle $AG_0$ but less than a second angle $AG_1$ from the positive portion of the I axis to the border between the next two sectors $SEC_1$, $SEC_2$, in which case the pre-sector is the second sector $SEC_1$; if not, whether the angle $AG_{RA}$ is greater than the second angle $AG_1$ but less than a third angle $AG_2$ from the positive portion of the I axis to the border between the next two sectors $SEC_2$, $SEC_3$, in which case the pre-sector is the third sector $SEC_2$; or if not, whether the angle $AG_{RA}$ is greater than the third angle $AG_2$, in which case the pre-sector is the fourth sector $SEC_3$. It can be pre-decided whether an angle $AG_{RA}$ equal to the first, second, or third angles $AG_0$, $AG_1$, $AG_2$ is to be considered part of the greater or lesser numbered bordering sector.

Generally speaking, the ith angle $AG_i$ from the positive portion of the I axis to the border between the ith and the (i+1)th sectors $SEC_i$, $SEC_{i+1}$ for any ring in a constellation with sectors of the type 702 illustrated in FIG. 7 is (i+1) multiplied by one half of the central angle 712 of a sector 702 (see FIGS. 7 and 8B), where the central angle 712 is equal to three-hundred sixty degrees divided by the total number of sectors SEC for the ring. In the example illustrated in FIG. 12, the angles $AG_0$, $AG_1$, $AG_2$, $AG_3$ can thus have the following values: 22.5 degrees, 45 degrees, and 67.5 degrees.

Figure 13A:
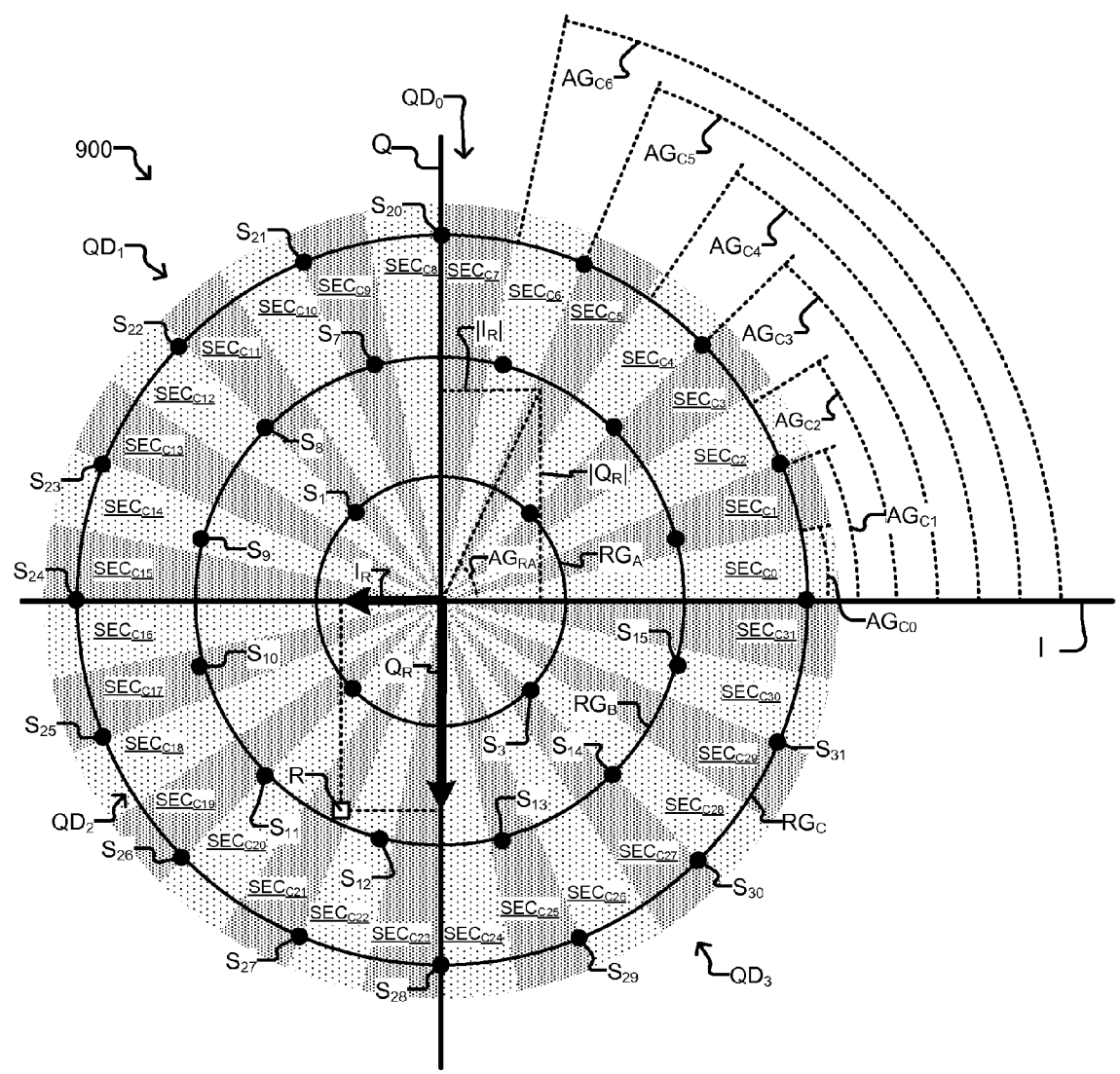
FIG. 13A shows an example of finding the sector in the outer symbol ring of the 32APSK constellation of FIGS. 9A-9C in which a received symbol R is located according to some embodiments of the invention.
Figure 13B:
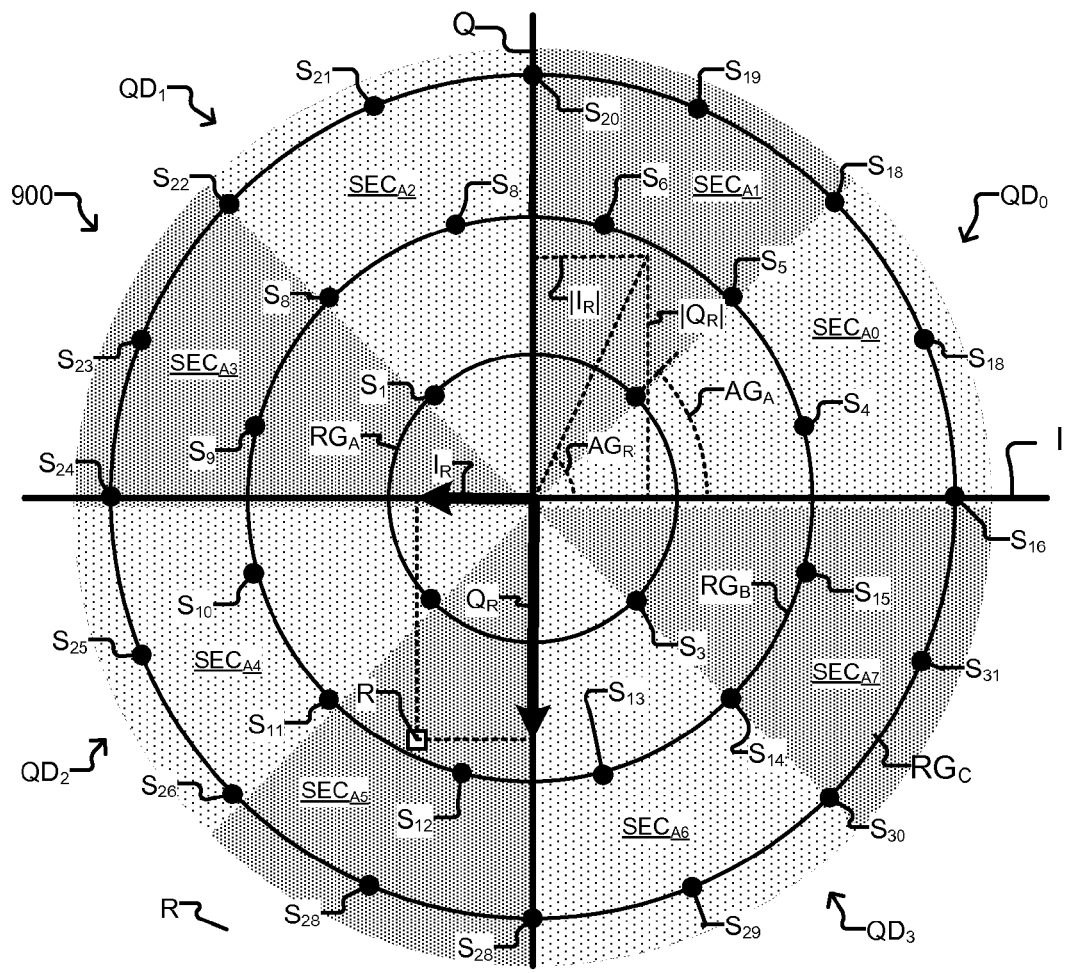
FIG. 13B shows an example of finding the location sector in the first symbol ring of the 32APSK constellation of FIGS. 9A-9C according to some embodiments of the invention.
Figure 13C:
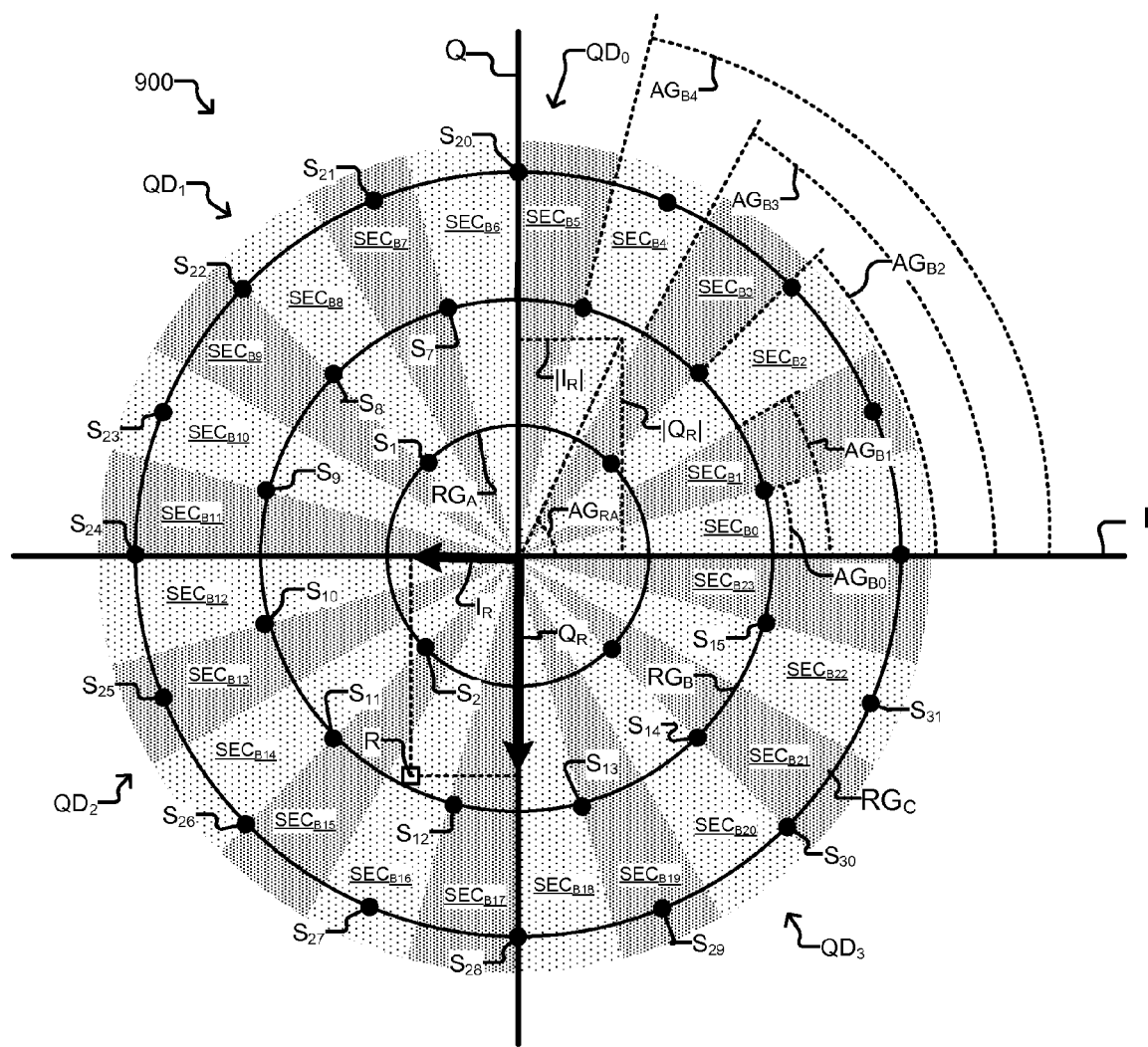
FIG. 13C shows an example of finding the location sector in the second symbol ring of the 32APSK constellation of FIGS. 9A-9C according to some embodiments of the invention.

The example in FIGS. 13A-13C is now discussed with regard to step 1002. For purposes of illustration and discussion, a received symbol R is illustrated in FIG. 13A as having a negative $I_R$ component with the magnitude shown and a negative $Q_R$ component with the magnitude shown, which places the received symbol R in the twenty-second sector $SEC_{C21}$ of the outer ring $RG_C$. The foregoing, however, is merely an example, and the $I_R$, $Q_R$ components of any received symbol R can have other magnitudes and signs and thus be located anywhere on the constellation 900.

At step 1002, the process 1000 (e.g., executed by the sector module 202) can determine the pre-sector for the received symbol R illustrated in FIG. 13A by determining the angle $AG_{RA}$ from the absolute values $|I_R|$, $|Q_R|$ of the $I_R$, $Q_R$ components of the received symbol R as discussed above. As can be seen in FIG. 13A, there are eight sectors $SEC_{C0}$, $SEC_{C1}$, $SEC_{C2}$, $SEC_{C3}$, $SEC_{C4}$, $SEC_{C5}$, $SEC_{C6}$, $SEC_{C7}$ that are at least partially in the first quadrant $QD_0$ of the 32APSK constellation 900. The pre-sector is thus one of the foregoing eight sectors $SEC_{C0}$, $SEC_{C1}$, $SEC_{C2}$, $SEC_{C3}$, $SEC_{C4}$, $SEC_{C5}$, $SEC_{C6}$, $SEC_{C7}$. Generally as discussed above, the process 1000 can determine which of the foregoing sectors is the pre-sector for the received symbol R by comparing the angle $AG_{RA}$ to angles of borders between the eight sectors $SEC_{C0}$, $SEC_{C1}$, $SEC_{C2}$, $SEC_{C3}$, $SEC_{C4}$, $SEC_{C5}$, $SEC_{C6}$, $SEC_{C7}$ in the first quadrant $QD_0$ of the constellation 900 as follows. If the angle $AG_{RA}$ is: less than $AG_{C0}$ (the angle from the positive portion of the I axis to the border between the first and second sectors $SEC_{C0}$, $SEC_{C1}$), the pre-sector is $SEC_{C0}$; between $AG_{C0}$ and $AG_{C1}$ (the angle from the positive portion of the I axis to the border between the second and third sectors $SEC_{C1}$, $SEC_{C2}$), the pre-sector is $SEC_{C1}$; between $AG_{C1}$ and $AG_{C2}$ (the angle from the positive portion of the I axis to the border between the third and fourth sectors $SEC_{C2}$, $SEC_{C3}$), the pre-sector is $SEC_{C2}$; between $AG_{C2}$ and $AG_{C3}$ (the angle from the positive portion of the I axis to the border between the fourth and fifth sectors $SEC_{C3}$, $SEC_{C4}$), the pre-sector is $SEC_{C3}$; between $AG_{C3}$ and $AG_{C4}$ (the angle from the positive portion of the I axis to the border between the fifth and sixth sectors $SEC_{C4}$, $SEC_{C5}$), the pre-sector is $SEC_{C4}$; between $AG_{C4}$ and $AG_{C5}$ (the angle from the positive portion of the I axis to the border between the fifth and sixth sectors $SEC_{C5}$, $SEC_{C6}$), the pre-sector is $SEC_{C5}$; between $AG_{C5}$ and $AG_{C6}$ (the angle from the positive portion of the I axis to the border between the sixth and seventh sectors $SEC_{C6}$, $SEC_{C7}$), the pre-sector is $SEC_{C6}$; or greater than $AG_{C6}$, the pre-sector is $SEC_{C7}$. It can be pre-decided whether an angle $AG_{RA}$ that is equal to one of the angles $AG_{C0}$, $AG_{C1}$, $AG_{C2}$, $AG_{C3}$, $AG_{C4}$, $AG_{C5}$, $AG_{C6}$ makes the pre-sector the greater or lesser numbered bordering sector.

Per the example formula discussed above with respect to FIG. 9 in which the ith angle $AG_i$ from the I axis to the border between the ith and the (i+1)th sectors $SEC_i$, $SEC_{i+1}$ for any ring in a constellation with sectors of the type 702 illustrated in FIG. 7 is (i+1) multiplied by one half of the central angle 712 of a sector 702 (where the central angle 712 is equal to three-hundred sixty degrees divided by the total number of sectors SEC in the ring), in the example illustrated in FIG. 13C, the angles $AG_{C0}$, $AG_{C1}$, $AG_{C2}$, $AG_{C3}$, $AG_{C4}$, $AG_{C5}$, $AG_{C6}$ can be 11.25 degrees, 22.5 degrees, 33.75 degrees, 45 degrees, 56.25 degrees, 67.5 degrees, and 78.75 degrees.

Referring again to FIG. 10, at step 1004, the process 1000 can utilize the pre-sector identified at step 1002 to determine the location sector for the outer ring $RG_O$. The sector module 202, configured as shown in FIG. 11, can perform step 1004 as follows. The UQ module 1102 can provide the signs sgn $(I_R)$, sgn$(Q_R)$ of the $I_R$, $Q_R$ components to the location sector module 1116, which can output the location sector 204 for the outer ring $RG_O$.

Turning first a discussion of step 1004 with respect to the example of the 8PSK constellation 800 illustrated in FIG. 12, as should be apparent from FIG. 12, each sector $SEC_0$, $SEC_1$, $SEC_2$, $SEC_2$ or portion of those sectors in the first quadrant $QD_0$ of the constellation 800 has a mirror image in another quadrant $QD_1$, $QD_2$, $QD_3$ of the constellation 800 with respect to the I axis, the Q axis, or both the I axis and the Q axis. Depending on the signs sgn$(I_R)$, sgn$(Q_R)$ of the $I_R$, $Q_R$ components of the received symbol R, the location sector will be: the same as the pre-sector if the signs sgn$(I_R)$, sgn$(Q_R)$ are both positive;

the mirror image of the pre-sector in the second quadrant $QD_1$ if sgn$(I_R)$ is negative and sgn$(Q_R)$ is positive; the mirror image of the pre-sector in the third quadrant $QD_2$ if the signs sgn$(I_R)$, sgn$(Q_R)$ are both negative; and the mirror image of the pre-sector in the fourth quadrant $QD_3$ if sgn$(I_R)$ is positive and sgn$(Q_R)$ is negative. Per the foregoing, Table 3 below summarizes the resulting location sector that can be determined at step 1004 for the constellation 800 for each possible combination of the signs of $I_R$ and $Q_R$ and the pre-sector $SEC_n$ determined at step 1002.

TABLE 3

| Sign $I_R$ | Sign $Q_R$ | Pre-Sector | Location sector |
|---|---|---|---|
| + | + | $SEC_0$ | $SEC_0$ |
| + | + | $SEC_1$ | $SEC_1$ |
| + | + | $SEC_2$ | $SEC_2$ |
| + | + | $SEC_3$ | $SEC_3$ |
| − | + | $SEC_0$ | $SEC_7$ |
| − | + | $SEC_1$ | $SEC_6$ |
| − | + | $SEC_2$ | $SEC_5$ |
| − | + | $SEC_3$ | $SEC_4$ |
| − | − | $SEC_0$ | $SEC_8$ |
| − | − | $SEC_1$ | $SEC_9$ |
| − | − | $SEC_2$ | $SEC_{10}$ |
| − | − | $SEC_3$ | $SEC_{11}$ |
| + | − | $SEC_0$ | $SEC_{15}$ |
| + | − | $SEC_1$ | $SEC_{14}$ |
| + | − | $SEC_2$ | $SEC_{13}$ |
| + | − | $SEC_3$ | $SEC_{12}$ |

The relationships in Table 3 can be stored as a digital look up table (LUT) in, for example, the memory 302 of the symbol de-mapper module 110 configuration shown in FIG. 3. Such a LUT can be used in a software implementation of the location sector module 1116. Alternatively, the relationships of Table 3 can be programmed into digital logic circuitry that is part of the circuitry 306 of FIG. 3, and such digital logic circuitry can operate to perform step 1004 of FIG. 10. As yet another alternative, a combination of software and digital logic circuitry can be configured to perform step 1004 in accordance with the relationships in Table 3. The foregoing and other configurations are possible.

As noted above, in the example illustrated in FIG. 12, the pre-sector determined at step 1002 is $SEC_2$. As shown in FIG. 12, the signs of the $I_R$ and $Q_R$ components of the received symbol R are positive and negative respectively. Per Table 3, the location sector determined at step 1004 is $SEC_{13}$.

Turning next to a discussion of step 1004 with respect to the example of the 32APSK constellation 900 illustrated in FIG. 13A, as should be apparent from FIG. 13A, each of the eight sectors $SEC_{C0}$, $SEC_{C1}$, $SEC_{C2}$, $SEC_3$, $SEC_{C4}$, $SEC_{C5}$, $SEC_6$, $SEC_{C7}$ or portion of those sectors in the first quadrant $QD_0$ of the constellation 900 has a mirror image in another quadrant $QD_1$, $QD_2$, $QD_3$ with respect to the I axis, the Q axis, or both the I axis and the Q axis. Table 4 below summarizes the resulting location sector that can be determined at step 1004 for the third and outer ring $RG_C$ of the constellation 900 for each possible combination of the signs of $I_R$ and $Q_R$ and the pre-sector number $SEC_{Cn}$ determined for the outer ring $RG_C$ at step 1002.

TABLE 4

| Sign $I_R$ | Sign $Q_R$ | Pre-Sector | Location sector |
|---|---|---|---|
| + | + | $SEC_{C0}$ | $SEC_{C0}$ |
| + | + | $SEC_{C1}$ | $SEC_{C1}$ |
| + | + | $SEC_{C2}$ | $SEC_{C2}$ |
| + | + | $SEC_{C3}$ | $SEC_{C3}$ |
| + | + | $SEC_{C4}$ | $SEC_{C4}$ |
| + | + | $SEC_{C5}$ | $SEC_{C5}$ |
| + | + | $SEC_{C6}$ | $SEC_{C6}$ |
| + | + | $SEC_{C7}$ | $SEC_{C7}$ |
| − | + | $SEC_{C0}$ | $SEC_{C15}$ |
| − | + | $SEC_{C1}$ | $SEC_{C14}$ |
| − | + | $SEC_{C2}$ | $SEC_{C13}$ |
| − | + | $SEC_{C3}$ | $SEC_{C12}$ |
| − | + | $SEC_{C4}$ | $SEC_{C11}$ |
| − | + | $SEC_{C5}$ | $SEC_{C10}$ |
| − | + | $SEC_{C6}$ | $SEC_{C9}$ |

TABLE 4-continued

| Sign $I_R$ | Sign $Q_R$ | Pre-Sector | Location sector |
|---|---|---|---|
| − | + | $SEC_{C7}$ | $SEC_{C8}$ |
| − | − | $SEC_{C0}$ | $SEC_{C16}$ |
| − | − | $SEC_{C1}$ | $SEC_{C17}$ |
| − | − | $SEC_{C2}$ | $SEC_{C18}$ |
| − | − | $SEC_{C3}$ | $SEC_{C19}$ |
| − | − | $SEC_{C4}$ | $SEC_{C20}$ |
| − | − | $SEC_{C5}$ | $SEC_{C21}$ |
| − | − | $SEC_{C6}$ | $SEC_{C22}$ |
| − | − | $SEC_{C7}$ | $SEC_{C23}$ |
| + | − | $SEC_{C0}$ | $SEC_{C31}$ |
| + | − | $SEC_{C1}$ | $SEC_{C30}$ |
| + | − | $SEC_{C2}$ | $SEC_{C29}$ |
| + | − | $SEC_{C3}$ | $SEC_{C28}$ |
| + | − | $SEC_{C4}$ | $SEC_{C27}$ |
| + | − | $SEC_{C5}$ | $SEC_{C26}$ |
| + | − | $SEC_{C6}$ | $SEC_{C25}$ |
| + | − | $SEC_{C7}$ | $SEC_{C24}$ |

Generally as discussed above with respect to Table 3, the relationships in Table 4 can be stored as a digital look up table (LUT) in, for example, the memory 302 of the symbol demapper module 110 configuration shown in FIG. 3. Such a LUT can be used in a software implementation of the location sector module 1116. Alternatively, the relationships of Table 4 can be programmed into digital logic circuitry that is part of the circuitry 306 of FIG. 3, and such digital logic circuitry can operate to perform step 1004 of FIG. 10. As yet another alternative, a combination of software and digital logic circuitry can be configured to perform step 1004 in accordance with the relationships in Table 4. The foregoing and other configurations are possible.

Returning to FIG. 10, at step 1006, the process 1000 can utilize the location sector for the outer ring $RG_O$ determined at step 1004 a location sector for all of the inner rings $RG_A$, . . . of the constellation 500. Turning first to the example of the 8PSK constellation 800 illustrated in FIG. 12, because there is only one ring RG, step 1006 need not be performed.

As can be seen in FIGS. 13A-13C, however, the 32ASPK constellation 900 illustrated in FIGS. 13A-13C has two inner rings $RG_A$, $RG_B$. The process 1000 can perform step 1006 for the inner rings $RG_A$, $RG_B$ in any of a number of possible ways. For example, a mapping of each sector $SEC_{C0}$-$SEC_{C31}$ of the outer ring $RG_C$ can be stored in a look up table (LUT) in the memory 302 of FIG. 3 or hardwired in the circuitry 306 of FIG. 3 and utilized by the location sector module 1116 to determine, from the location sector of the outer ring $RG_O$, a location sector for each of the rings $RG_A$, $RG_B$. As another example, step 1006 can be performed by repeating steps 1002, 1004 for each inner ring $RG_A$, $RG_B$. FIGS. 13B and 13C illustrate examples.

FIG. 13B illustrates an example of the process 1000 performing step 1006 for the first ring $RG_A$ by repeating steps 1002, 1004. For example, the pre-selector module 1112 of FIG. 11 can utilize the absolute values $|I_R|$, $|Q_R|$ of the $I_R$, $Q_R$ components of the received symbol R to identify sector $SEC_{A1}$ in the example shown in FIG. 13B as the pre-sector. That is, the pre-sector module 1112 can determine whether the angle $AG_{RA}$ of the absolute values $|I_R|$, $|Q_R|$ of the $I_R$, $Q_R$ components is less than or greater than an angle $AG_A$ (which can be forty-five degrees) from the positive portion of the I axis to the border between the first sector $SEC_{A0}$ and second sector $SEC_{A1}$ of the first ring $RG_A$ that are in quadrant $QD_0$ of the constellation and thereby identify the pre-sector. At step 1004, the pre-sector module 1112 can then utilize the foregoing pre-sector ($SEC_{A1}$ in the example shown in FIG. 13B) and the signs $sgn(I_R)$, $sgn(Q_R)$ of the $I_R$, $Q_R$ components of the received symbol R to identify the location sector for the first ring $RG_A$ (which is $SEC_{A5}$ for the example shown in FIG. 13B).

Similarly, as shown in FIG. 13C, at step 1002, the pre-sector module 1112 can utilize the absolute values $|I_R|$, $|Q_R|$ of the $I_R$, $Q_R$ components of the received symbol R to identify sector $SEC_{B4}$ in the example shown in FIG. 13C as the pre-sector for the second ring $RG_B$. That is, the pre-sector module 1112 can determine whether the angle $AG_{RA}$ of the absolute values $|I_R|$, $|Q_R|$ of the $I_R$, $Q_R$ components is: less than $AGB_0$ (the angle from the positive portion of the I axis to the border between the first and second sectors $SEC_{B0}$, $SEC_{B1}$), in which case the pre-sector is $SEC_{B0}$; between $AG_{B0}$ and $AG_{B1}$ (the angle from the positive portion of the I axis to the border between the second and third sectors $SEC_{B1}$, $SEC_{B2}$), in which case the pre-sector is $SEC_{B1}$; between $AG_{B1}$ and $AG_{B2}$ (the angle from the positive portion of the I axis to the border between the third and fourth sectors $SEC_{B2}$, $SEC_{B3}$), in which case the pre-sector is $SEC_{B2}$; between $AG_{B2}$ and $AG_{B3}$ (the angle from the positive portion of the I axis to the border between the fourth and fifth sectors $SEC_{B3}$, $SEC_{B4}$), in which case the pre-sector is $SEC_{B3}$; between $AG_{B3}$ and $AG_{B4}$ (the angle from the positive portion of the I axis to the border between the fifth and sixth sectors $SEC_{B4}$, $SEC_{B5}$), in which case the pre-sector is $SEC_{B4}$; or greater than $AG_{B4}$, in which case the pre-sector is $SEC_{B5}$. (It can be pre-decided whether the angles $AG_{B0}$, $AG_{B1}$, $AG_{B2}$, $AG_{B3}$, $AG_{B4}$ are to be considered part of the greater or lesser numbered bordering sector.) In the example shown in FIG. 13C, the values of the angles $AG_{B0}$, $AG_{B1}$, $AG_{B2}$, $AG_{B3}$, $AG_{B4}$ can be 15 degrees, 30 degrees, 45 degrees, 60 degrees, and 75 degrees. At step 1004, the location sector module 1116 can then utilize the foregoing pre-sector ($SEC_{B5}$ in the example shown in FIG. 13C) and the signs $sgn(I_R)$, $sgn(Q_R)$ of the $I_R$, $Q_R$ components of the received symbol R to identify the location sector for the second ring $RG_B$ (which is $SEC_{B16}$ for the example shown in FIG. 13C).

Whether performed in accordance with the process 1000 of FIG. 10 or otherwise, step 402 of FIG. 4 can thus provide a location sector for each of the rings $RG_A$, . . . $RG_O$ of the constellation 500 of FIG. 5 as discussed above in which the constellations 800, 900 are specific examples of the constellation 500. As also noted, step 402 can be performed by the sector module 202 of FIG. 2, which can provide the location sectors 204 for each ring to the bit modules 200.

After the sector locations for each symbol ring are determined at step 402, soft values for the n bits of the received symbol R can be calculated by performing steps 404 through 408 of the process 400 of FIG. 4 for each bit (which can be performed by the bit modules 200 of FIG. 2). That is, a soft value of the jth bit of the received symbol R can be determined for each performance of steps 404 through 408, where the steps 404 through 408 are performed n times for the jth bit being bit 0 through n−1.

Figure 14:
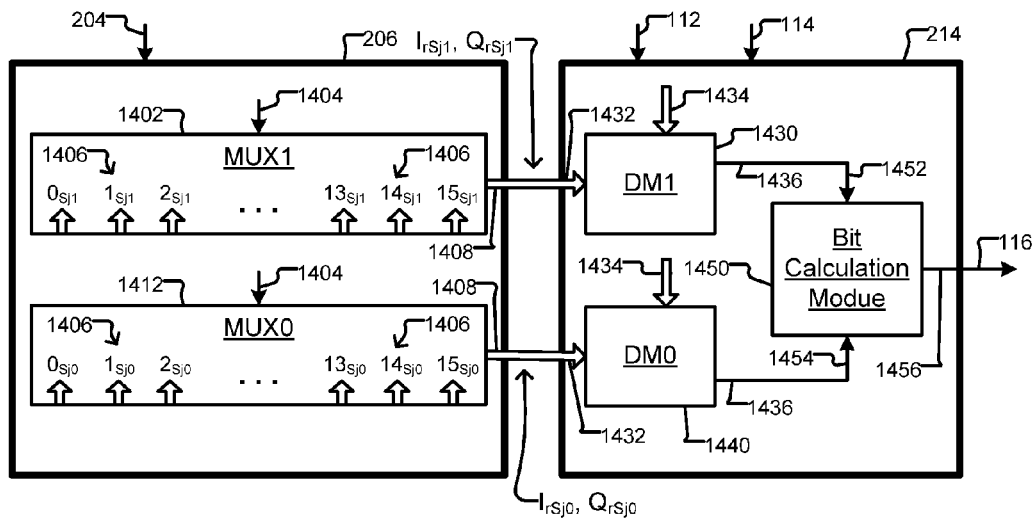
FIG. 14 illustrates example configurations of the ring-pair module and nearest-pair module of FIG. 2 for de-mapping received symbols R of the 8PSK constellation of FIGS. 8A and 8B according to some embodiments of the invention.

At step 404, the process 400 can select a ring symbol pair rSj1, rSj0 for each ring $RG_A$, . . . $RG_O$ of the constellation 500 of FIG. 5. Step 404 can be performed by the ring-pairs module 206 of FIG. 2. The ring-pairs module 206 can do so utilizing a look up table (LUT) in which a ring symbol pair rSj1, rSj0 is stored for each sector of each ring in the constellation 500. Such a LUT can be stored in the memory 302 of FIG. 3 and utilized by the processor 304 in a software implementation of the ring-pairs module 206. Alternatively, the relationship of ring symbol pairs nSj1, nSj0 to sectors in rings can be hardwired into the circuitry 306 of FIG. 3. For example, ring symbol pairs nSj1, nSj0 for each ring of a constellation can be hardwired as inputs to multiplexers (which can be part of the circuitry 306 of FIG. 3). The select input that determines which input of a multiplexer is output from the multiplexer can be controlled by the location sector outputs 204 from the sector module 202 in FIG. 2. Examples of such multiplexers are illustrated in FIGS. 14 and 17 and discussed below.

There can be one symbol rSj1 and one symbol rSj0 on the rth symbol ring that are closer than all other symbols S on the ring to any received symbol R located anywhere in a given sector of the ring. For example, for any received symbol R in sector $SEC_0$ in the 8PSK constellation 800 of FIGS. 8A and 8B, the nearest symbol rSj1 whose first bit $b_0$ is one is $S_0$, and the nearest symbol rSj0 whose first bit $b_0$ is zero is symbol $S_1$. As another example, for any received symbol R in sector $SEC_{13}$ in the 8PSK constellation 8 of FIGS. 8A and 8B, the nearest symbol rSj1 whose first bit $b_0$ is one is symbol $S_7$, and the nearest symbol rSj0 whose first bit $b_0$ is zero is symbol $S_1$.

With respect to the 32APSK constellation 900 illustrated in FIGS. 9A-9D, for any received symbol R in sector $SEC_{45}$ of ring $RG_A$, the closest symbol aSj1 on the ring $RG_A$ whose second bit $b_1$ is one is symbol $S_2$, and the nearest symbol aSj0 on the ring $RG_A$ whose second bit $b_1$ is zero is symbol $S_1$. With respect to the first bit $b_0$, however, the value is one for all of the symbols $S_0$, $S_1$, $S_2$, $S_3$ on the first ring $RG_A$. There is thus an aSj1—namely, $S_2$—but there is not an aSj0. In such a case, the missing symbol (in this example, aSj0) in the pair can be assigned a dummy symbol located a maximum distance in the constellation from any location in the sector in question (in this example, $SEC_{45}$). A pair of symbols rSj1, rSj0 (one of which can be a dummy symbol) can thus be associated with every sector of every ring in the constellation. The result of step 404 can thus be a pair of symbols rSj1, rSj0 for each ring in the constellation 500. In the example, of the 8PSK constellation 800 of FIGS. 8A and 8B, the result will be only one pair of symbols Sj1, Sj0 because there is only one ring RG. In the example of the 32APSK constellation 900 of FIGS. 9A-9D, the result of step 404 can be three pairs of symbols rSj1, rSj0, which is one pair for each ring $RG_A$, $RG_B$, $RG_C$. The ring-pairs module 206 can thus provide the symbol pairs rSj1, rSj0 208 to the nearest-pair module 210. Because only two symbols S are selected per ring, the symbols rSj1, rSj0 selected at step 404 are less than all (and thus a limited subset) of the symbols S in the constellation.

Still referring to FIG. 4, at step 406, the process 400 can determine nearest symbols nSj1, nSj0 from among the symbols of the ring symbol pairs rSj1, rSj0 identified at step 404. That is, at step 406, the process 400 can determine which one of the rSj1 symbols and which one of the rSj0 symbols selected at step 404 are the closest on the I/Q diagram of the constellation 500 to the received symbol R. Step 406 can be accomplished by determining a distance value for each of the symbols rSj1, rSj0 selected at step 404. The distance value for each symbol rSj1, rSj0 can correspond to (e.g., be, be a function of, be proportion to, or be related to) the distance (e.g., the Euclidean distance) between the symbol rSj1 or rSj0 and the received symbol R on the IQ diagram of the constellation 500. For example, as is known, the Euclidean distance between a received symbol R and a constellation symbol S can be the square root of the following: $(I_R-I_S)^2+(Q_R-Q_S)^2$. The square of the Euclidean distance $((I_R-I_S)^2+(Q_R-Q_S)^2)$ can be an example a distance value.

The nearest symbol nSj1 selected at step 406 can be the one of the symbols rSj1 selected at step 404 whose distance value is the smallest, and the nearest symbol nSj0 selected at step 406 can likewise be the one of the symbols rSj0 selected at step 404 whose distance value is the smallest. The result of step 406, and thus the output 212 of the nearest-pair module 210 of FIG. 2 (which can perform step 406), can thus be to identify the nearest symbols nSj1, nSj0, which are the closest symbols S in the constellation whose kth bit is one and zero, respectively, to the received symbol R. It is noted that the nearest symbols nSj1, nSj0 can be determined at step 406 (and by the nearest-pair module 210 of FIG. 10) by calculating a distance value only for the rSj1, rSj0 symbols identified at step 404 (e.g., by the ring-pairs module 206) rather than all of the symbols S in the constellation.

Step 406 need not be performed or can be left out of the process 400 for constellations that have only one ring of symbols S (e.g., like the 8PSK constellation 800 illustrated in FIGS. 8A and 8B). This is because step 404 will produce only one symbol pair Sj1, Sj0, which are by default the nearest symbols nSj1, nSj0 to the received symbol R.

Step 406 can be performed by the nearest-pair module 210 of FIG. 2. In a software embodiment, the nearest-pair module 210 can comprise software stored in the memory 302 and executed by the processor 304 of FIG. 3. Alternatively, the circuitry 306 of FIG. 3 can comprise mathematical hardware modules such as digital adders, digital subtractors, digital multipliers, and/or the like for performing step 406. The nearest-pair module 210 can thus comprise such mathematical hardware and/or software for performing step 406.

As mentioned, in the example of the 8PSK constellation 800, step 406 need not be performed because step 404 produces only one pair of Sj1, Sj0 symbols, which are by default the closest nSj1, nSj0 symbols to the received symbol R.

In the example of the 32APSK constellation 900, the process 400 can calculate distance values for the distances between the received symbol R and each of the rSj1 symbol from the first ring $RG_A$, the rSj1 symbol from the second ring $RG_B$, and the rSj1 symbol from the third ring $RG_C$ and select the rSj1 symbol with the smallest distance value as the nearest symbol nSj1. The process 400 can similarly calculate distance values for the distances between the received symbol R and each of the rSj0 symbol from the first ring $RG_A$, the rSj0 symbol from the second ring $RG_B$, and the rSj0 symbol from the third ring $RG_A$ and select the symbol rSj0 with the smallest distance value as the nearest symbol nSj0.

The result of step 406, and thus the output 212 of the nearest-pair module 210 of FIG. 2, can be the symbols nSj1, nSj0 and/or distance values d(R, nSj1) (which can be a distance value corresponding to the distance between the received symbol R and the nSj1 symbol) and d(R, nSj0) (which can be a distance value corresponding to the distance between the received symbol R and the nSj0 symbol).

At step 408, the process 400 can utilize the nearest symbols nSj1, nSj0 (or their respective distance values) to calculate a soft value for the jth bit of the received symbol R. The process 400 can do so by utilizing the distance values d(R, nSj1) and d(R, nSj0). For example, the soft value can be proportional to a mathematical relationship between the distance values d(R, nSj1) and d(R, nSj0). Examples of such mathematical relationships include a subtraction difference (e.g., d(R, nSj1)–d(R, nSj0) or d(R, nSj0)–d(R, nSj1)) and a ratio (e.g., d(R, nSj1)/d(R, nSj0) or d(R, nSj0)/d(R, nSj1)). Thus, for example, the soft value of the jth bit of the received symbol R can be a function of (e.g., proportional to) any of the following: d(R, nSj1)–d(R, nSj0); d(R, nSj0)–d(R, nSj1); d(R, nSj1)/d(R, nSj0); d(R, nSj0)/d(R, nSj1); or the like.

In some embodiments, an approximation of a log likelihood ratio (LLR) soft value for the jth bit of the received symbol R can be calculated in accordance with the following formula: LLR≈(d(R, nSj0)–d(R, nSj1))*K, wherein "≈" means approximately equals, and K is a scaling constant (e.g., 2πσ). The soft value of the jth bit of the received symbol R can thus be, in some embodiments, proportional to a difference between the distance values d(R, nSj1), d(R, nSj0).

Step 408 can be performed by the soft-value module 214 of FIG. 2. In a software embodiment, the soft-value module 214 can comprise software stored in the memory 302 of FIG. 3 and executed by the processor 304. Alternatively, the circuitry 306 of FIG. 3 can comprise mathematical hardware modules such as digital adders, digital subtractors, digital multipliers, and/or the like for performing step 406. The soft-value module 214 can thus comprise such mathematical hardware and/or software for performing step 408.

As mentioned, at steps 404 through 408, the process 400 can determine a soft value for the jth bit of the received symbol R. Steps 404 through 408 can be repeated for each bit of the received symbol R. In some embodiments, repeated performances of steps 404 through 408 can be sequential. In other embodiments, such as the parallel implementation depicted in FIG. 2, the symbol de-mapper module 110 can perform each repetition of steps 404 through 408 in parallel.

As noted, the symbol de-mapper module 110 (which can be configured as illustrated in FIG. 2) can perform the process 400. As also noted, the modules 202, 206, 210, 214 of the configuration of the symbol de-mapper module 110 illustrated in FIG. 2 can be configured in software, hardware, or a combination of software and hardware. FIG. 14 illustrates an example of a bit module 200 of FIG. 2, including the ring-pairs module 206 and the soft-value module 214, configured for the 8PSK constellation 800 shown in FIGS. 8A and 8B, and FIG. 17 shows an example of a bit module 200, including the ring-pairs module 206, the nearest-pair module 210, and the soft-value module 214, configured for the 32 APSK constellation 900 illustrated in FIGS. 9A-9D.

Turning first to FIG. 14, as shown, the ring-pairs module 206 can comprise multiplexers MUX1 1402, MUX0 1412 each of which can comprise a select input 1404, sector inputs 1406, and a symbol output 1408. There can be a sector input 1406 for each sector $SEC_0$ through $SEC_{15}$ of the 8PSK constellation 800 (see FIGS. 8A and 8B). The $I_S$, $Q_S$ components of symbols S in the constellation 800 can be connected to each sector input 1406 (which can thus comprise two signal inputs), and a signal at the select input 1404 can control which sector input 1406 is connected to the output 1408 (which can thus comprise two signal outputs for the $I_S$, $Q_S$ components).

A sector location signal 204 from the sector module 202 (as produced by step 402 of FIG. 4) can be provided to the ring-pairs module 206 as shown in FIGS. 2 and 14 and discussed above. Although not shown in order to simplify the illustration in FIG. 14, the sector location signal 204 can be connected to the selectors 1404 of the multiplexers MUX1 1402, MUX0 1412. The symbol rSj1 of the ring symbol pair rSj1,rSj0 for each sector $SEC_0$ through $SEC_{15}$ can be connected to a corresponding sector input 1406 of the MUX1 multiplexer 1402, and the symbol rSj0 of the ring symbol pair rSj1, rSj0 for each sector $SEC_0$ through $SEC_{15}$ can likewise be connected to a corresponding sector input 1406 of the MUX0 multiplexer 1412. Thus, the multiplexer MUX1 1402 can output 1408 the rSj1 symbol for the selected sector $SEC_0$ through $SEC_{15}$ identified by the location sector signal 204, and the multiplexer MUX0 1412 can output 1408 the rSj0 symbol for the location sector signal 204.

As noted above, because the 8PSK constellation 800 has only one ring RG and there is thus only one ring symbol pair rSj1, rSj0, the symbols in the ring symbol pair rSj1, rSj0 are by default the nearest symbols nSj1, nSj0. The nearest module 210 can thus be left out of the symbol de-mapper module 110. Accordingly, as shown in FIG. 14, the ring-pair module 206 can provide the symbol pair rSj1,rSj0 as the nearest-pair symbols nSj1,nSj0 directly to the soft-value module 214.

As also shown in FIG. 14, the soft-value module 214 can comprise distance modules DM1 1430, DM0 1440 each of which can comprise a symbol input 1432 for the $I_S$, $Q_S$ components of a symbol S from one of the multiplexers 1402, 1412; a received symbol input 1434 (which can be connected to the inputs 112, 114 (see FIGS. 1 and 2)) for the $I_R$, $Q_R$ components of the received symbol R; and a distance value output 1436. Each distance module DM1 1430, DM0 1440 can be configured to determine a distance value that corresponds to the distance between the symbol S at its symbol input 1432 and the received symbol R at its received symbol input 1434 and output 1436 the distance value.

As shown, the distance module DM1 1430 can receive the rSj1 symbol at its input 1432 from MUX1 1402, and the distance module DM0 1440 can receive the rSj0 symbol at its input 1432 from MUX0 1412. Both distance modules DM1 1430, DM0 1440 can receive the $I_R$, $Q_R$ components of the received symbol R at their inputs 1434. (Although not shown in FIG. 14 for the sake of simplicity, the inputs 112, 114 (see FIGS. 1 and 2) can be connected to the inputs 1434 of the distance modules DM1 1430, DM0 1440.) The distance module DM1 1430 can thus output 1436 a distance value d(R, rSj1) for the distance between the symbol rSj1 and the received symbol R, and the distance module DM1 1440 can output 1436 a distance value d(R, rSj0) for the distance between the symbol rSj0 and the received symbol R.

As shown, a bit calculation module 1450 can receive as inputs 1452, 1454 the distance values d(R, rSj1), d(R, rSj0) output 1436 by the distance modules DM1 1430, DM0 1440 and determine a soft value for the jth bit of the transmitted signal R. The bit calculation module 1450 can, for example, determine a soft value from the nearest symbols nSj1, nSj0 for the jth bit in any manner discussed above with respect to step 408 of FIG. 4.

Figure 15:
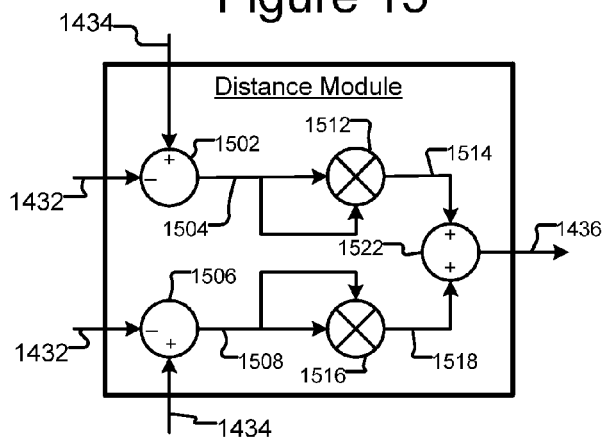
FIG. 15 shows an example configuration of a distance module of FIG. 14 according to some embodiments of the invention.
Figure 16:
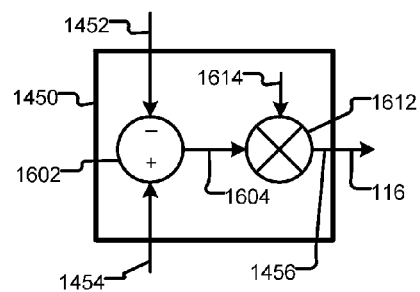
FIG. 16 illustrates an example configuration of the bit calculation module of FIG. 14 according to some embodiments of the invention.

FIG. 15 illustrates an example configuration of a distance module 1430, 1440 and FIG. 16 illustrates an example configuration of the bit calculation module 1450.

As shown in FIG. 15, a distance module 1430, 1440 can comprise an I subtractor 1502, a Q subtractor 1506, an I multiplier 1512, a Q multiplier 1516, and an adder 1522. Each of the foregoing can comprise hardwired digital circuitry (e.g., portions of the circuitry 306 of FIG. 3) and/or software (e.g., stored in the memory 302 and executed by the processor 304 of FIG. 3).

The I subtractor 1502 can be configured to subtract the $I_S$ component of a symbol S at its symbol input 1432 from the $I_R$ component of a received symbol R at its received symbol input 1434. The I subtractor 1502 can thus produce at its output 1504 the difference $I_R-I_S$. As shown, the I multiplier can multiply the output 1504 by itself and thus produce at its output 1514 the difference $I_R-I_S$ squared: $(I_R-I_S)^2$.

The Q subtractor 1506 and Q multiplier 1516 can be similar. That is, the Q subtractor 1506 can be configured to subtract the $Q_S$ component of the symbol S at its symbol input 1432 from the $Q_R$ component of the received symbol R at its received symbol input 1434. The Q subtractor 1506 can thus produce at its output 1508 the difference $Q_R-Q_S$. As shown, the Q multiplier can multiply the output 1508 by itself and thus produce at its output 1518 the difference $Q_R-Q_S$ squared: $(Q_R-Q_S)^2$.

As shown in FIG. 15, the adder 1522 can add the output 1514 from the I multiplier 1512 and the output 1518 from the Q multiplier 1516. As also shown, the output 1436 of the adder 1522 (which can also be the output 1436 of a distance module 1430, 1440) can thus be the sum of the squared differences $I_R-I_S$, $Q_R-Q_S$. That is, the output 1436 of a distance module 1430 configured as shown in FIG. 15 can be: $(I_R-I_S)^2+(Q_R-Q_S)^2$. The foregoing result is the square of the Euclidean distance between the symbol S at the symbol input 1432 and the received symbol R at the received symbol input 1434 per the Pythagorean formula. The output 1436 of the distance module 1430 thus corresponds (e.g., is a function of, proportional to, or related to) the distance between the symbol S at the symbol input 1432 and the received symbol R at the received symbol input 1434. The distance module 1430 can be modified to output 1436 as the actual distance between the symbol S and the received symbol R by calculating the square root of the output of the adder 1522, and providing the calculated square root as the output 1436 of the distance module 1430.

As shown in FIG. 16, the bit calculation module 1450 can comprise a subtractor 1602 and a multiplier 1612, which can be configured in software, digital hardware, or a combination of software and hardware generally as discussed above with respect to FIG. 3. As shown, the subtractor 1602 can receive at its inputs 1452, 1454 the distance values output 1436 by the distance modules DM1 1430, DM0 1440 and subtract the distance value d(R, Sj1) from the distance value d(R, Sj0). The output 1604 of the subtractor can thus be: d(R, Sj0)−d(R, Sj1). The multiplier 1612 can then multiply the output 1604 from the subtractor 1602 by a constant K 1614. The constant K can be any constant as needed or desired. For example, as discussed above with respect to step 408 of FIG. 4, the soft value determined by the soft-value module 1440 can be an approximation of an LLR value, and the constant K can be $2\pi\sigma$.

As mentioned, FIG. 17 shows an example of the ring-pairs module 206 and the nearest-pair module 210 of the symbol de-mapper module 110 configured for the 32ASPK constellation 900 of FIGS. 9A-9D. As shown in FIG. 17, the ring-pairs module 206 can comprise a plurality of multiplexers MUXA1 1702, MUXB1 1704, MUXC1 1706, MUXA0 1708, MUXB0 1710, MUXC0 1712. Each of the foregoing multiplexers can be configured generally like the multiplexers 1402, 1412 of FIG. 14. For example, each multiplexer 1702 through 1712 can comprise a select input 1404, sector inputs 1406, and a symbol output 1408, which can be the same as like numbered elements in FIG. 14.

As discussed above, the sector module 202 can provide location sector signals 204 for each ring in the constellation. Because there are three rings $RG_A$, $RG_B$, $RG_A$ in the 32APSK constellation 900 of FIGS. 9A-9D, there are three location sector signals 204, which are identified in FIG. 17 as sector location signals 1722, 1724, 1726. Although not shown in FIG. 17 for simplicity and ease of illustration, the ring $RG_A$ location sector signal 1722 can be connected to the select inputs 1404 of the MUXA1 1702 and MUXA0 1708. Similarly, the ring $RG_B$ location sector signal 1724 can be connected to the select inputs 1404 of the MUXB1 1704 and MUXB0 1710, and the ring $RG_C$ location sector signal 1726 can be connected to the select inputs 1406 of the MUXC1 1706 and MUXC0 1712.

The MUXA1 1702, MUXA0 1708 can each include an input 1406 for each sector $SEC_{A0}$ through $SEC_{A7}$ of the first ring $RG_A$. The aSj1 symbol in the ring symbol pair aSj1,aSj0 for each sector $SEC_{A0}$ through $SEC_{A7}$ of the first ring $RG_A$ can be connected to a corresponding sector inputs 1406 of the MUXA1 1702, and the aSj0 symbol in the ring symbol pair aSj1,aSj0 for each sector $SEC_{A0}$ through $SEC_{A7}$ of the first ring $RG_A$ can similarly be connected to a corresponding sector inputs 1406 of the MUXA0 1708. The ring $RG_A$ location sector signal 1722 thus causes the ring symbol pair aSj1, aSj0 for the location sector of the ring $RG_A$ to be output 1408 from the MUXA1 1702, MUXA0 1708.

Similarly, the MUXB1 1704, MUXB0 1710 can each include an input 1406 for every sector $SEC_{B0}$ through $SEC_{B23}$ of the second ring $RG_B$. The bSj1 symbol in the ring symbol pair bSj1, bSj0 for each sector $SEC_{B0}$ through $SEC_{B23}$ of the second ring $RG_B$ can be connected to a corresponding sector input 1406 of the MUXB1 1704, and the bSj0 symbol in the ring symbol pair bSj1, bSj0 for each sector $SEC_{B0}$ through $SEC_{B23}$ of the second ring $RG_B$ can similarly be connected to a corresponding sector input 1406 of the MUXB0 1710. The second ring $RG_B$ location sector signal 1724 can thus cause the ring symbol pair bSj1, bSj0 for the location sector signal 724 of the ring $RG_B$ to be output 1408 from the MUXB1 1704, MUXB0 1710.

Likewise, the MUXC1 1706, MUXC0 1712 can each include an input 1406 for every sector $SEC_{C0}$ through $SEC_{C31}$ of the outer ring $RG_C$. The cSj1 symbol in the ring symbol pair cSj1, cSj0 for each sector $SEC_{C0}$ through $SEC_{C31}$ of the third ring $RG_C$ can be connected to a corresponding sector input 1406 of the MUXC1 1706, and the cSj0 symbol in the ring symbol pair cSj1, cSj0 for each sector $SEC_{C0}$ through $SEC_{C31}$ of the third ring $RG_C$ can similarly be connected to a corresponding sector input 1406 of the MUXC0 1712. The third ring $RG_C$ location sector signal 1726 can thus cause the ring symbol pair cSj1, cSj0 to be output 1408 from the multiplexers MUXC1 1706, MUXC0 1712.

The ring-pairs module 206, configured as illustrated in FIG. 17, can thus provide to the nearest-pair module 210 from MUXA1 1702, MUXB1 1704, MUXC1 1706 three symbols aSj1, bSj1, cSj1 whose kth bit is one and three symbols aSj0, bSj0, cSj0 whose kth bit is zero. Moreover, the foregoing six symbols S are the closest symbols in the constellation to any received symbol R in the location sectors of the rings $RG_A$, $RG_B$, $RG_C$.

As shown in FIG. 17, the nearest-pair module 210 can comprise distance modules DMA1 1732, DMB1 1734, DMC1 1736, DMA0 1738, DMB0 1740, DMC0 1742 each of which can be configured generally like the distance modules 1430, 1440 of FIG. 14, and like number elements can be the same. For example, each distance module 1732, 1734, 1736, 1738, 1740, 1742 can comprise a symbol input 1432 for the $I_S$, $Q_S$ components of a symbol S and a received symbol input 1434 for the $I_R$, $Q_R$ components of a received symbol R, and each distance module can determine a distance value d(R, S) for a distance between the received symbol R and the symbol S. The distance modules can be configured as shown in FIG. 15.

As also shown in FIG. 17, the distance modules DMA1 1732, DMB1 1734, DMC1 1736 can calculate and then output 1436 to a minimum module MIM1 1752 distance values (as discussed above) d(R, aSj1), d(R, bSj1), d(R, cSj1) for each of the symbols aSj1, bSj1, cSj1. The MIM1 1752 can determine which of the distance values d(R, aSj1), d(R, bSj1), d(R, cSj1) is the smallest and can output 1746 the smallest distance value, which is the distance value corresponding to the closest aSj1, bSj1, cSj1 symbol to the received symbol R.

Similarly, the distance modules DMA0 1738, DMB0 1740, DMC0 1742 can calculate and then output 1436 to a minimum module MIM0 1754 distance values (as discussed above) d(R, aS0, d(R, bSj0), d(R, cSj0) for each of the symbols aSj0, bSj0, cSj0. The MIM0 1754 can determine which of the distance values d(R, aS0, d(R, bSj0), d(R, cSj0) is the smallest and can output 1748 the smallest distance value, which is the distance value corresponding to the closest aSj0, bSj0, cSj0 symbol to the received symbol R. As previously noted, the closest of the foregoing symbols with a kth bit of one is referred to herein as the nSj1, and the closest of the foregoing symbols with a kth bit of zero is referred to as the nSj0.

The nearest-pair module 210 can thus output 1746, 1756 two distance values d(R, nSj1), d(R, nSj0) to the soft-value module 214, where those distance values correspond to the distance between the closest symbol nSj1 whose kth bit is one to the received symbol R and the distance between the closest symbol nSj0 whose kth bit is zero. The soft-value module 214 (which can be configured as shown in FIG. 16) can then utilize those distance values d(R, nSj1), d(R, nSj0) to determine a soft value for the kth bit if the received symbol R in any manner discussed above.

Although specific examples of an 8PSK constellation 800 (see FIGS. 8A and 8B) and a 32APSK constellation 900 (see FIGS. 9A-9D) are illustrated in the drawings and discussed above, the invention is not limited to 8PSK and 32APSK constellations. Rather, embodiments of the invention can de-map other constellations. For example, embodiments of the invention can de-map symbols in a QPSK (quad phase shift keying) constellation, a 16APSK constellation, a 64APSK constellation, or the like.

For example, the multiplexers MUXA1 1702, MUXA0 1708 and distance modules DMA1 1732, DMA0 738 in FIG. 17 can be utilized to de-map a received symbol R from a QPSK constellation. As another example, the multiplexers MUXA1 1702, MUXB1 1704, MUXA0 1708, MUXB0 1710 and distance modules DMA1 1732, DMB1 734, DMA0 1738, DMB0 740 in FIG. 17 can be utilized to de-map a received symbol S from a 16APSK constellation with two rings. As yet another example, the multiplexers MUXC1 1706, MUXC0 1712 and distance modules DMC1 1736, DMC0 742 in FIG. 17 can be utilized to de-map a received symbol R from a 16APSK constellation with one ring.

Although specific embodiments and applications of the invention have been described in this specification, these embodiments and applications are exemplary only, and many variations are possible.

We claim:

1. A process of determining a soft value of a bit of a received symbol R, wherein said received symbol R corresponds to a symbol S in a constellation of symbols S each having a unique ordered pair of an in-phase $I_S$ component value and a quadrature $Q_S$ component value, said process comprising:
   receiving an electrical signal comprising a received symbol R, wherein said received symbol R comprises an in-phase $I_R$ component and a quadrature $Q_R$ component;
   identifying a location sector of a symbol ring in said constellation, wherein said received symbol R is located in said location sector, and said location sector is one of a plurality of sectors of said symbol ring;
   selecting a limited subset of said symbols S of said constellation, wherein said limited subset is related to said location sector and comprises less than all of said symbols S of said constellation; and
   determining with ones of said symbols S of said limited subset a soft value of a jth bit of said received symbol R.

2. The process of claim 1, wherein said identifying comprises utilizing an angle corresponding to said $I_R$ component and said $Q_R$ component of said received symbol R to identify said location sector.

3. The process of claim 1, wherein said identifying comprises:
   utilizing an angle of an absolute value of said $I_R$ component and an absolute value of said $Q_R$ component of said received symbol R to identify an initial one of said sectors of said symbol ring in a first quadrant of said constellation; and
   utilizing said initial one of said sectors, a sign of said $I_R$ component, and a sign of said $Q_R$ to identify said location sector in which said received symbol R is located.

4. The process of claim 1, wherein said selecting comprises selecting a pair of symbols rSj1, rSj0 on said symbol ring, wherein at least one of said symbols rSj1, rSj0 meets the following conditions:
   said symbol rSj1 is the nearest, to any received symbol R located in said location sector, one of said symbols S on said symbol ring with a jth bit value of one, or
   said symbol rSj0 is the nearest, to any received symbol R located in said location sector, one of said symbols S on said symbol ring with a jth bit value of zero.

5. The process of claim 3, wherein no more than one of said symbols S of said constellation is located in each of said plurality of sectors.

6. The process of claim 4, wherein said selecting selects no symbols S on said symbol ring other than said symbols rSj1, rSj0.

7. The process of claim 4, wherein said determining comprises:
   calculating a first distance value corresponding to a distance between said symbol rSj1 and said received symbol R,
   calculating a second distance value corresponding to a distance between said symbol rSj0 and said received symbol R, and
   calculating said soft value utilizing said first distance value and said second distance value.

8. The process of claim 5, wherein:
   each one of said sectors of said symbol ring is a circular sector;
   an origin of each one of said sectors of said symbol ring is located at a center of said symbol ring; and
   none of said sectors of said symbol ring overlaps another of said sectors of said symbol ring.

9. The process of claim 7, wherein:
   said first distance value comprises $((I_R-I_{rSj1})^2+(Q_R-Q_{rSj1})^2)$, where $I_{rSj1}$ is an in-phase component of said symbol rSj1 and $Q_{rSj1}$ is an quadrature component of said symbol rSj1, and
   said second distance value comprises $((I_R-I_{rSj0})^2+(Q_R-Q_{rSj0})^2)$, where $I_{rSj0}$ is an in-phase component of said symbol rSj1 and $Q_{rSj0}$ is an quadrature component of said symbol rSj0.

10. The process of claim 7, wherein said calculating said soft value comprises calculating a difference between said first distance value and said second distance value.

11. A process of determining a soft value of a bit of a received symbol R, wherein said received symbol R corresponds to a symbol S in a constellation of symbols S each having a unique ordered pair of an in-phase $I_S$ component value and a quadrature $Q_S$ component value, said symbols S are disposed on a plurality of symbol rings in said constellation, and each said symbol ring comprises a plurality of sectors, said process comprising:
   receiving an electrical signal comprising a received symbol R, wherein said received symbol R comprises an in-phase $I_R$ component and a quadrature $Q_R$ component;
   identifying, for each of said symbol rings, one of said plurality of sectors as a location sector in which said received symbol R is located;

selecting with said location sectors a limited subset of said symbols S of said constellation, wherein said limited subset comprises less than all of said symbols S of said constellation;

determining nearest symbols nSj1, nSj0 from said limited subset of said symbols S, wherein said symbol nSj1 is a nearest symbol S, to said received symbol R, in said limited subset with a jth bit value of one, and said symbol nSj0 is a nearest symbol S, to said received symbol R, in said limited subset with a jth bit value of zero; and calculating with said symbol nSj1 and said symbol nSj0 a soft value of a jth bit of said received symbol R.

12. The process of claim 11, wherein said determining comprises:

calculating distance values for symbols S in said limited subset, wherein each said distance value corresponds to a distance between one of said symbols S in said limited subset and said received symbol R;

selecting as said symbol nSj1 one of said symbols S in said limited subset whose jth bit is one and whose said distance value is smallest; and selecting as said symbol nSj01 one of said symbols S in said limited subset whose jth bit is zero and whose said distance value is smallest.

13. The process of claim 11, wherein said identifying comprises:

utilizing an angle of an absolute value of said $I_R$ component and an absolute value of said $Q_R$ component of said received symbol R to identify an initial sector of an outer one of said symbol rings in a first quadrant of said constellation; and utilizing said initial sector, a sign of said $I_R$ component, and a sign of said $Q_R$ to identify a location sector of said outer one of said symbol rings.

14. The process of claim 11, wherein said selecting comprises selecting a pair of symbols rSj1, rSj0 on each said symbol ring, wherein at least one of said symbols rSj1, rSj0 on each symbol ring meets the following conditions:

said symbol rSj1 is a nearest, to any received symbol R located in said location sector of said symbol ring, one of said symbols S on said symbol ring with a jth bit value of one, or said symbol Sj0 is a nearest, to any received symbol R located in said location sector of said symbol ring, one of said symbols S on said symbol ring with a jth bit value of zero.

15. The process of claim 12, wherein said calculating said soft value comprises calculating a difference between said distance value of said symbol S selected as said nSj1 symbol and said distance value of said symbol S selected as said nSj0 symbol.

16. The process of claim 13, wherein no more than one of said symbols S of said constellation is located in each of said plurality of sectors of each of said symbol rings.

17. The process of claim 14, wherein said selecting selects no symbols S on any of said symbol rings other than said pair of symbols rSj1, rSj0 on each said symbol ring.

18. A symbol de-mapping apparatus for processing a received symbol R, wherein said received symbol R corresponds to a symbol S in a constellation of symbols S each having a unique ordered pair of an in-phase $I_S$ component value and a quadrature $Q_S$ component value, said apparatus comprising:

a sector module configured to receive as input an in-phase $I_R$ component and a quadrature $Q_R$ component of a received symbol R and output a location sector in which said received symbol R is located, wherein said location sector is one of a plurality of sectors of a symbol ring of said constellation;

a ring-pairs module configured to receive as input said location sector from said sector module and output a limited subset of said symbols S of said constellation corresponding to said location sector, wherein said limited subset comprises less than all of said symbols S of said constellation; and a soft-value module configured to calculate with ones of said symbols S of said limited subset a soft value of a jth bit of said received symbol R.

19. The apparatus of claim 18, wherein said sector module comprises:

a pre-sector module configured to identify an initial one of said sectors of said symbol ring in a first quadrant of said constellation from an angle of an absolute value of said $I_R$ component and an absolute value of said $Q_R$ component of said received symbol R; and a location sector module configured to identify said location sector from said initial one of said sectors utilizing a sign of said $I_R$ component and a sign of said $Q_R$ of said received symbol R.

20. The apparatus of claim 18, wherein said ring pairs module comprises digital multiplexers configured to output in response to said location sector from said sector module for any of said sectors a pair of symbols rSj1, rSj0 on said symbol ring, wherein at least one of said symbols rSj1, rSj0 meets the following conditions:

said symbol rSj1 is a nearest, to any received symbol R located in said location sector, one of said symbols S on said symbol ring with a jth bit value of one, or said symbol rSj0 is a nearest, to any received symbol R located in said location sector, one of said symbols S on said symbol ring with a jth bit value of zero.

21. The apparatus of claim 18, wherein said limited subset includes no symbols S on said symbol ring other than symbols rSj1, rSj0, wherein at least one of said symbols rSj1, rSj0 meets the following conditions:

said symbol rSj1 is a nearest, to any received symbol R located in said location sector, one of said symbols S on said symbol ring with a jth bit value of one, or said symbol rSj0 is a nearest, to any received symbol R located in said location sector, one of said symbols S on said symbol ring with a jth bit value of zero.

22. The apparatus of claim 18, wherein:

said sector module is further configured to output a plurality of location sectors in which said received symbol R is located, wherein each said location sector is one of a plurality of sectors of one of a plurality of different symbol rings of said constellation; and said ring-pairs module is further configured to receive as input said location sectors from said sector module and output said limited subset includes symbols S from each of said symbol rings corresponding to each of said location sectors.

23. The apparatus of claim 21, wherein said soft-value module comprises:

a first distance module configured to calculate a first distance value corresponding to a distance between said symbol rSj1 and said received symbol R, a second distance module configured to calculate a second distance value corresponding to a distance between said symbol rSj0 and said received symbol R, and a bit calculation module configured to utilized said first distance value and said second distance value to calculate said soft value of said jth bit of said received symbol R.

24. The apparatus of claim 22, wherein said ring pairs module comprises digital multiplexers configured to output, in response to each said location sector, a pair of symbols rSj1, rSj0 for each of said symbol rings, wherein at least one of said symbols rSj1 and rSj0 in each pair meets the following conditions:
said symbol rSj1 in said pair is a nearest, to any received symbol R located in a corresponding one of said location sectors, one of said symbols S on one of a corresponding one of said symbol rings with a jth bit value of one, or
said symbol rSj0 in said pair is a nearest, to any received symbol R located in a corresponding one of said location sectors, one of said symbols S on one of a corresponding one of said symbol rings with a jth bit value of zero.

25. The apparatus of claim 23, wherein each said distance module comprises:
a first digital subtractor configured to determine a difference between an in-phase component of one of said symbols rSj1 or rSj0 output by said multiplexers and said $I_R$ component of said received symbol R;
a first digital multiplier configured to multiply an output of said first digital subtractor by itself;
a second digital subtractor configured to determine a difference between a quadrature component of another of said symbols rSj1 or rSj0 output by said multiplexers and said $Q_R$ component of said received symbol R;
a second digital multiplier configured to multiply an output of said second digital subtractor by itself; and
a digital adder configured to add an output from said first digital multiplier and an output from said second digital multiplier.

26. The apparatus of claim 23, wherein said bit calculation module comprises:
a digital subtractor configured to determine a difference between said second distance value and said first distance value; and
a digital multiplier configured to multiply an output of said digital subtractor by a value of an input signal.

27. The apparatus of claim 24, wherein said limited subset includes no symbols S from any of said symbol rings other than said pair of symbols rSj1, rSj0 from each said symbol ring.

28. The apparatus of claim 24, wherein:
said apparatus further comprises a nearest-pair module configured to receive as input said limited subset of symbols S from said ring-pairs module and output a nearest pair nSj1, nSj0 from said limited subset of symbols S, wherein said nSj1 is a nearest symbol S, to said received symbol R, in said limited subset with a jth bit value of one, and said nSj0 is a nearest symbol S, to said received symbol R, in said limited subset with a jth bit value of zero; and
said soft-value module is further configured to calculate said soft value of said jth bit of said received symbol R with said nSj1 symbol and said nSj0.

29. The apparatus of claim 28, wherein said nearest-pair module comprises:
a first set of distance modules each configured to calculate a distance value corresponding to a distance between one of said symbols nSj1 in said limited subset and said received symbol R;
a first minimum module configured to receive as input said distance values from said first set of distance modules and output a smallest of said distance values for said symbols nSj1;
a second set of distance modules each configured to calculate a distance value corresponding to a distance between one of said symbols nSj0 in said limited subset and said received symbol R; and
a second minimum module configured to receive as input said distance values from said second set of distance modules and output a smallest of said distance values for said symbols nSj0.

30. The apparatus of claim 29, wherein said soft-value module is further configured to calculate said soft value of said jth bit of said received symbol R utilizing a difference between said smallest of said distance values for said symbols Sj0 and said smallest of said distance values for said symbols Sj1.

31. The apparatus of claim 30, wherein said soft-value module is still further configured to calculate said soft value of said jth bit of said received symbol R by determining a product of a scaling constant and said difference between said smallest of said distance values for said symbols Sj0 and said smallest of said distance values for said symbols Sj1.

* * * * *